United States Patent [19]

Wolfram

[11] Patent Number: 4,809,202
[45] Date of Patent: Feb. 28, 1989

[54] METHOD AND APPARATUS FOR SIMULATING SYSTEMS DESCRIBED BY PARTIAL DIFFERENTIAL EQUATIONS

[75] Inventor: Stephen Wolfram, Princeton, N.J.

[73] Assignee: Thinking Machines Corporation, Cambridge, Mass.

[21] Appl. No.: 814,348

[22] Filed: Dec. 27, 1985

[51] Int. Cl.[4] ..................... G06F 15/328; G06F 15/16
[52] U.S. Cl. ................................... 364/578; 364/131; 364/200
[58] Field of Search ............... 364/510, 578, 131, 132, 364/200, 900

[56] References Cited

U.S. PATENT DOCUMENTS

| | | | |
|---|---|---|---|
| 3,939,336 | 2/1976 | Vasiliev et al. | 364/578 |
| 4,270,170 | 5/1981 | Reddaway | 364/200 |
| 4,523,273 | 6/1985 | Adams III. et al. | 364/200 |
| 4,587,625 | 5/1986 | Marino, Jr. et al. | 364/578 |

FOREIGN PATENT DOCUMENTS 926667  5/1982  U.S.S.R. .............................. 364/510

*Primary Examiner*—Felix D. Gruber
*Attorney, Agent, or Firm*—Pennie & Edmonds

[57] ABSTRACT

A method and apparatus are disclosed for using cellular automata to simulate systems described by partial differential equations such as those that describe the flow of fluid, diffusion or heat transfer. A two-dimensional space is tessellated into a cellular array of regular hexagons. Flow or diffusion into a cell through each of its six sides from each of its six nearest neighbor cells is represented by a value 1; and any other condition is represented by a value 0. A set of rules specifies the effect of such inward flow in terms of an outward flow through at least some of the same six sides of each cell to its nearest neighbors. Interaction of the flow with a surface or other inhomogeneity is simulated by using a different set of rules to specify the outward flow produced when an inward flow encounters a surface or other inhomogeneity in the cell. Outward flow from one cell is an inward flow into its nearest neighbors; and with the next "tick" of the clock of the mode, the cycle repeats itself. Over long periods of time such as tens of thousands of ticks of the clock, this process has been shown to simulate the flow of a real fluid against an inclined straight-edge.

39 Claims, 15 Drawing Sheets

FIG. 4
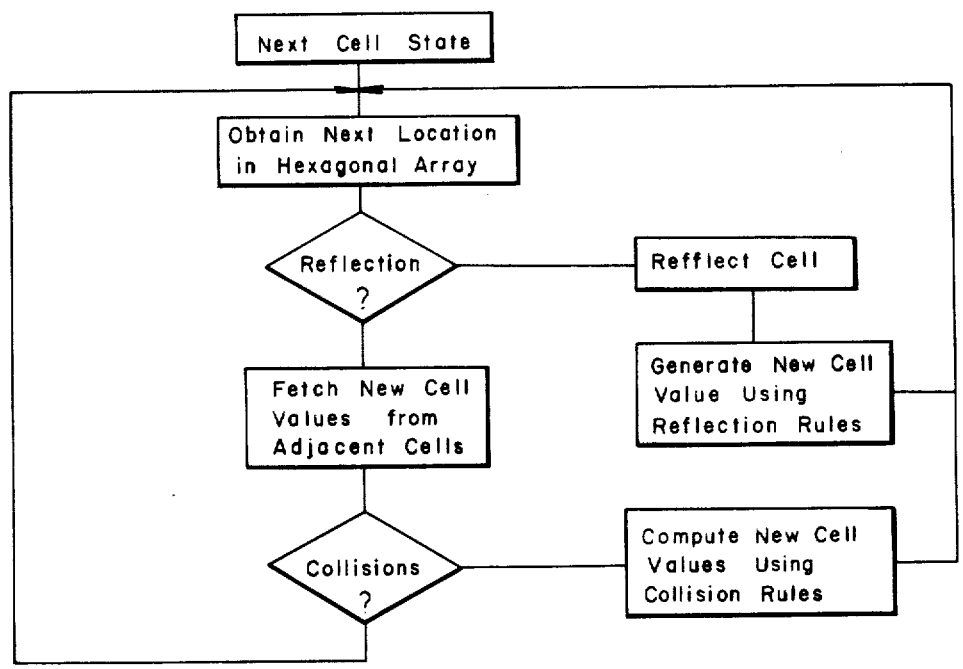
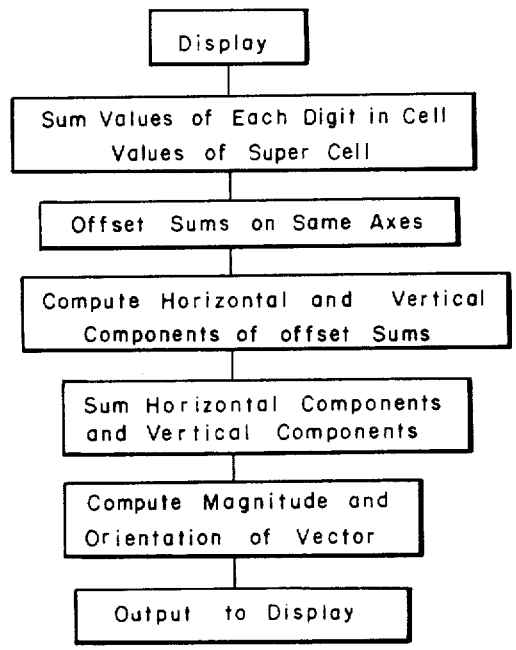

METHOD AND APPARATUS FOR SIMULATING SYSTEMS DESCRIBED BY PARTIAL DIFFERENTIAL EQUATIONS

CROSS REFERENCE TO RELATED APPLICATIONS

Related applications are "Parallel Processor", Ser. No. 499,474 and "Parallel Processor/Memory Circuit", Ser. No. 499,471, now U.S. Pat. No. 4,709,327 both filed May 31, 1983, "Method and Apparatus for Routing Message Packets", Ser. No. 671,835, filed Nov. 1, 1984, now U.S. Pat. No. 4,598,400 and "Method and Apparatus for Interconnecting Processors in a Hyper-Dimensional Array", Ser. No. 740,943, filed May 31, 1985, all of which are incorporated herein by reference.

BACKGROUND OF THE INVENTION

This relates to fluid dynamics and in particular to a method and apparatus for simulating systems described by partial differential equations.

One such system is that of fluid dynamics, a discipline of considerable practical importance. It is concerned with topics such as the flow of air past an airfoil, the flow of water past a ship's hull, and fluid flow n a pipeline.

Fluid flow at any point in a fluid stream can be described mathematically by the Navier-Stokes equation:

$$\frac{\partial \vec{\mu}}{\partial t} + \vec{\mu} \cdot \nabla \vec{\mu} = -\frac{1}{\rho} \nabla p + \nu \nabla^2 \vec{\mu} + \vec{F}$$

wherein
- $\mu$ is a vector specifying the direction of flow of the fluid at that point,
- $\rho$ is a scalar specifying the density of the fluid at that point,
- P is a scalar specifying the pressure in the fluid at that point,
- $\nu$ is a scalar specifying the kinematic viscosity of the fluid at that point, and
- $\vec{F}$ is a vector specifying an external force, typically gravity.

Exact solutions to partial differential equations, such as the Navier-Stokes equations, however, are generally unavailable. Rather, the equations must be solved by making simplifying assumptions, by algebraic or numerical approximations or by physical modeling of the relationship specified by the equation. For example, one or more terms of the equation can be ignored, or solutions can be found by algebraic techniques or by numerical techniques often aided by the enormous calculation abilities of a large computer, or a wind tunnel or water trough can be used to visualize what happens when a fluid flows past an object such as an airfoil or ship's hull. In some instances, it may be possible to perform computer simulations of the phenomena represented by the equation and derive solutions to he equation from such simulations.

More recently, it has been suggested that approximate solutions to the equations of fluid dynamics might be obtained by a computer model called a cellular automation. S. Wolfram, "Cellular Automata as Models of Complexity", *Nature*, Vol. 311, p. 419 (Oct. 4, 1984); S. Wolfram, "Statistical Mechanics of Cellular Automata", *Reviews of Modern Physics*, Vol. 55, No. 3, p. 601 (July 1983); N. H. Packard and S. Wolfram, "Two-Dimensional Cellular Automata", *J. of Statistical Physics*, Vol. 38, Nos. 5/6, p. 901 (1985). In this model, an arbitrary space is divided into an array of identical cells. The array is typically a two-dimensional array but it could be one-dimensional, three-dimensional or even higher dimensional. Each cell has one of a small number of possible values. Typically, the cell simply has a value of 0 or 1. The values of all these cells are simultaneously updated at each "tick" of a clock according to a set of rules that are applied uniformly to the value of each cell. These rules specify the new value for each cell on the basis of the previous values of some nearby group of cells. Typically, the new value of a cell is determined by the previous value of the cell and its nearest neighbor cells. Perhaps, the best known cellular automaton is the computer game called "Life" devised by John H. Conway.

For more information on cellular automata, see the above cited papers and S. Wolfram, "Computer Software in Science and Mathematics", *Scientific American*, Vol. 251, No. 3, p. 188 (September 1984); and S. Wolfram, "Universality and Complexity in Cellular Automata", *Physica* 10D, p. 1, (1984) which are incorporated herein by reference. For information concerning "Life" see M. Gardner, *Wheels, Life and Other Mathematical Amusements* (Freeman 1983); and M. Eigen and R. Winkler, *Laws of the Game*, Ch. 10 (Alfred A. Knopf, 1981).

SUMMARY OF THE INVENTION

The present invention is a method and apparatus for using cellular automata to simulate systems described by partial differential equations such as those that describe the flow of fluid, diffusion or heat transfer.

In a preferred embodiment of the invention, a two-dimensional space is tessellated into a cellular array of regular hexagons. Since each hexagonal cell has six sides, each cell has six nearest neighbors.

Flow or diffusion into a cell from a nearest neighbor cell is represented by a value 1 and any other condition is represented by a value 0. Accordingly, a six digit binary number is sufficient to represent all flow into a cell through its six sides.

In accordance with the invention, a set of rules specifies the effect of such inward flow in terms of an outward flow through at least some of the same six sides of each cell to its nearest neighbors. Such outward flow from one cell is represented by a value 1; and any other condition is represented by a value 0. Thus, a six digit binary number also can be used to represent all flow from a cell.

Interaction of the flow with a surface or other inhomogeneity is simulated by using a different set of rules to specify the outward flow produced when an inward flow encounters a surface or other inhomogeneity in the cell.

Outward flow from one cell is an inward flow into its nearest neighbors; and with the next "tick" of the clock of the model, the cycle repeats itself. The same set of rules specifies for each cell the effect of this new pattern of inward flow in terms of another pattern of an outward flow. This process continues for as long as one likes.

Over long periods of time such as tens of thousands of ticks of the clock, this process has been shown to simulate the flow of a real fluid about a surface. In particular, this process has been used to simulate flow in a space of 2048 × 2048 hexagonal cells. This space is divided into an array of 32×32 super cells each of which is comprised of 64×64 hexagonal cells. The flows in each hexagonal cell of the 4096 cells of each super cell are summed together to produce a single resultant flow which is then depicted on a graphical output. The array of 1024 such resultant flows has been found to provide a graphical solution to the Navier-Stokes equation for cases such as the flow of a fluid against an inclined straight edge.

The foregoing process may be implemented in many different ways. For example, each hexagonal cell could be represented by a look-up table that had six address input lines, one from each of its six nearest neighbor cells and six output lines to each of its six nearest neighbor cells. The output lines would be the input lines of the cells to which they were connected. The signals on the six address input lines constitute an address to the look-up table; and the look-up table implements the set of rules that specify the outputs on the six output lines for each of the 64 ($=2^6$) possible inputs that can be received at a cell. The six output lines provide the inputs to the six nearest neighbor cells required for the next determination of the outputs with the next "tick" of the clock.

Another alternative is to implement the invention in a conventional general purpose computer. Such an alternative, however, is not very practical because of the enormous number of table look-ups and/or calculations involved.

In a preferred embodiment of the invention, the simulation is implemented on a single instruction multiple data (SIMD) computer which makes it possible to perform thousands of these operations in parallel. One such SIMD computer on which the invention has been performed is the Connection Machine (Reg.TM) Computer made by the present assignee, Thinking Machines, Inc. of Cambridge, Mass. This computer is described more fully in U.S. patent application Ser. No. 499,474, filed May 31, 1985 which is incorporated herein by reference. In the embodiment of the Connection Machine Computer on which the invention has been practiced, the computer comprises 32,768 relatively small identical processors which are interconnected in a two-dimensional rectangular array. As will be described, the rectangular array can be operated so as to simulate a hexagonal array; and each processor can be operated so as to produce from six binary inputs six binary outputs in accordance with the set of rules that relate inward flow to outward flow. The six binary outputs can then be provided as inputs to adjacent cells in the hexagonal array and another set of outputs can be determined. The process can be repeated as much as desired. Furthermore, the outputs of all of the cells in each super cell can be summed at any time to produce a set of resultants for purposes of display or other output.

BRIEF DESCRIPTION OF DRAWING

These and other objects, features and elements of the invention will be more readily apparent from the following Description of the Preferred Embodiment of the Invention in which:

FIGS. 2A through 2I depict a simulation of fluid flow about a straight edge made in accordance with the teaching of the present invention;

FIG. 4 is a flow chart for the program set forth in Appendix I;

DESCRIPTION OF PREFERRED EMBODIMENT OF THE INVENTION

Figure 1:
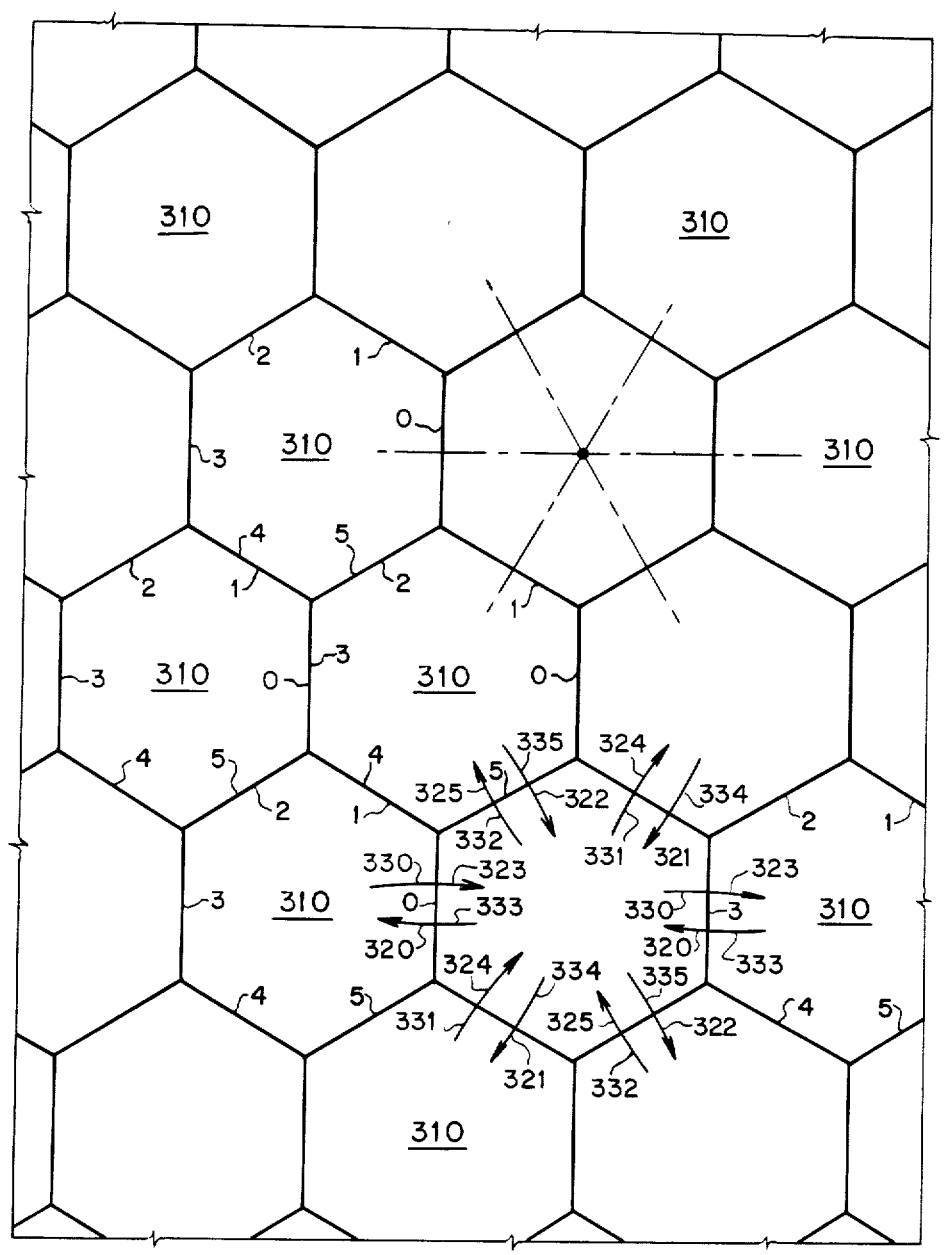
FIG. 1 depicts a two-dimensional surface which has been tessellated by an array of regular hexagons.

As shown in FIG. 1 a two dimensional plane can be tessellated by an array 300 of regular hexagons 310. Each hexagon has six sides 0, 1, 2, 3, 4, 5.

In accordance with the present invention, the flow of fluid, the transfer of heat, diffusion or the like in the two-dimensional plane of FIG. 1 is accounted for in terms of flow across the sides of the individual hexagons 310 of array 300. Flow into a hexagon is represented by flow lines 320, 321, 322, 323, 324, 325 through each of the six sides 0, 1, 2, 3, 4, 5, respectively, of a hexagon 310 and flow out of a hexagon is represented by flow lines 330, 331, 332, 333, 334, 335 through the same six sides of the hexagon. We may also refer to the direction of flow such that flow out of the hexagon through sides 0, 1, 2, 3, 4, 5, 6 constitutes flow in the directions right (R), up right (UR), up left (UL), left (L), down left (DL) and down right (DR), respectively. As will be apparent, the directions of flow are along three axes, a right-left axis which will be referred to as the 0-axis or horizontal axis, an up-right-down-left axis which will be referred to as the 1-axis and an up-left-down-right axis which will be referred to as the 2-axis.

Advantageously, the flow can be represented simply by a binary value in which the value one represents the presence of flow through a side of a hexagon and the value zero represents the absence of flow. Since each hexagon has six sides, a six digit binary number is sufficient to represent the presence or absence of flow through each of the six sides into the hexagon; and a six digit binary number is sufficient to represent the presence or absence of flow through each of the six sides out of the hexagon. If we include the possibility of no flow at all, there are 64 ($=2^6$) different possible permutations of input flows through the six sides of a hexagon and 64 possible outward flows.

In accordance with the invention, a set of rules specifies the effect of inward flow through the sides of the hexagon on outward flow through the same six sides. When the hexagon does not represent any barrier to the flow of fluid, these rules conserve momentum and the number of flows. Thus, flow into a hexagon through one side will result in flow out the opposite side of the hexagon unless such flow is offset by an equal and opposite flow. In the latter case, the total momentum of a pair of opposing flows is zero and the rules on conservation of momentum and the number of flows can be satisfied by flows emerging from any pair of opposite sides of the hexagon.

In particular, out of the 64 possible inward flow patterns, we can identify 14 unique inward flow patterns set forth in Table I. The remaining 50 flow patterns will on examination be found to be the same as one of the 14 flow patterns, but merely rotated to a different orientation in the hexagon. For each of the 14 flow patterns, the rules of conservation of momentum and number of flows permit the outward flow patterns identified in the right hand column of Table I. Obviously, if the inward flow pattern is rotated or displaced from that shown in the left hand column, the outward flow pattern shown in the right hand column must be rotated or displaced the same amount to conserve momentum.

TABLE I

|  | Inward Flow | Outward Flow |
|---|---|---|
| Hexagon Side: | 5 4 3 2 1 0 | 5 4 3 2 1 0 |
|  | 0 0 0 0 0 0 | 0 0 0 0 0 0 |
|  | 1 0 0 0 0 0 | 0 0 0 1 0 0 |
|  | 1 0 0 1 0 0 | 1 0 0 1 0 0 |
|  |  | 0 1 0 0 1 0 |
|  |  | 0 0 1 0 0 1 |
|  | 1 0 1 0 0 0 | 0 0 0 1 0 1 |
|  | 1 1 0 0 0 0 | 0 0 0 1 1 0 |
|  | 1 0 1 0 1 0 | 1 0 1 0 1 0 |
|  |  | 0 1 0 1 0 1 |
|  | 1 1 0 0 1 0 | 0 1 0 1 1 0 |
|  |  | 0 0 1 1 0 1 |
|  | 1 1 0 1 0 0 | 1 0 0 1 1 0 |
|  |  | 0 0 1 0 1 1 |
|  | 1 1 1 0 0 0 | 0 0 0 1 1 1 |
|  | 1 1 0 1 1 0 | 1 1 0 1 1 0 |
|  |  | 1 0 1 1 0 1 |
|  |  | 0 1 1 0 1 1 |
|  | 1 1 1 0 1 0 | 0 1 0 1 1 1 |
|  | 1 1 1 1 0 0 | 1 0 0 1 1 1 |
|  | 1 1 1 1 1 0 | 1 1 0 1 1 1 |
|  | 1 1 1 1 1 1 | 1 1 1 1 1 1 |

Interaction of flow with a surface is simulated by using a different set of rules to specify the outward flow that is produced when an inward flow encounters a surface in the hexagon. Different sets of rules may be used. For example, an inward flow through one side of the hexagon may be reflected so that it leaves through the same side of the hexagon. In this case, the table of outward flows is the same as the table of inward flows. Alternatively, inward flow through one side of the hexagon may be reflected so that it exits through a side of the hexagon that is shifted one or two sides from the entrant side. In this case, the table of outward flows is the same as the table of inward flows, but rotated one or two spaces to the left or right.

In accordance with the invention, flow through the plane is determined for a unit time (or a "tick" of the clock) by applying the rules of Table I and the reflection rules wherever appropriate at each hexagon in array 300. For each pattern of inward flows into a hexagon a pattern of outward flows is determined from these rules. Since the hexagons tessellate the plane, outward flows from one cell are inward flows into each of its six nearest neighbors. These inward flows constitute a new set of inward flows at each hexagon in the array; and in the next unit time (or "tick" of the clock) these inward flows are used in another cycle of the process to determine another set of outward flows in accordance with the rules of Table I and the reflection rules as appropriate.

Over long periods of time such as tens of thousands of cycles, this process has been shown to simulate the flow of a real fluid about a surface. In particular, this process has been used to simulate flow in a space of 2048×2048 hexagonal cells. This space is divided into an array of 32×32 super cells each of which is comprised of 64×64 hexagonal cells. The flows in each hexagonal cell of the 4096 cells of each super cell are summed together to produce a single resultant flow which is then depicted on a graphical output. The array of 1024 such resultant flows has been found to provide a graphical solution to the Navier-Stokes equation for cases such as the flow of a fluid against an inclined straight edge.

Figure 2A:
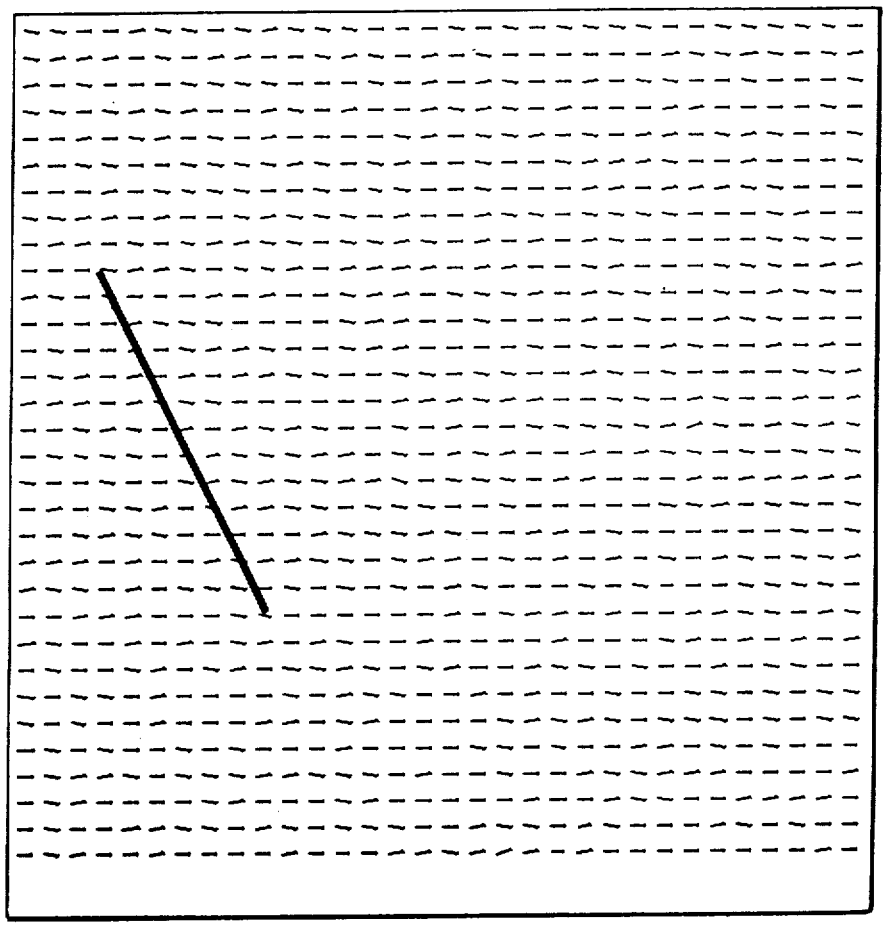
Figure 2B:
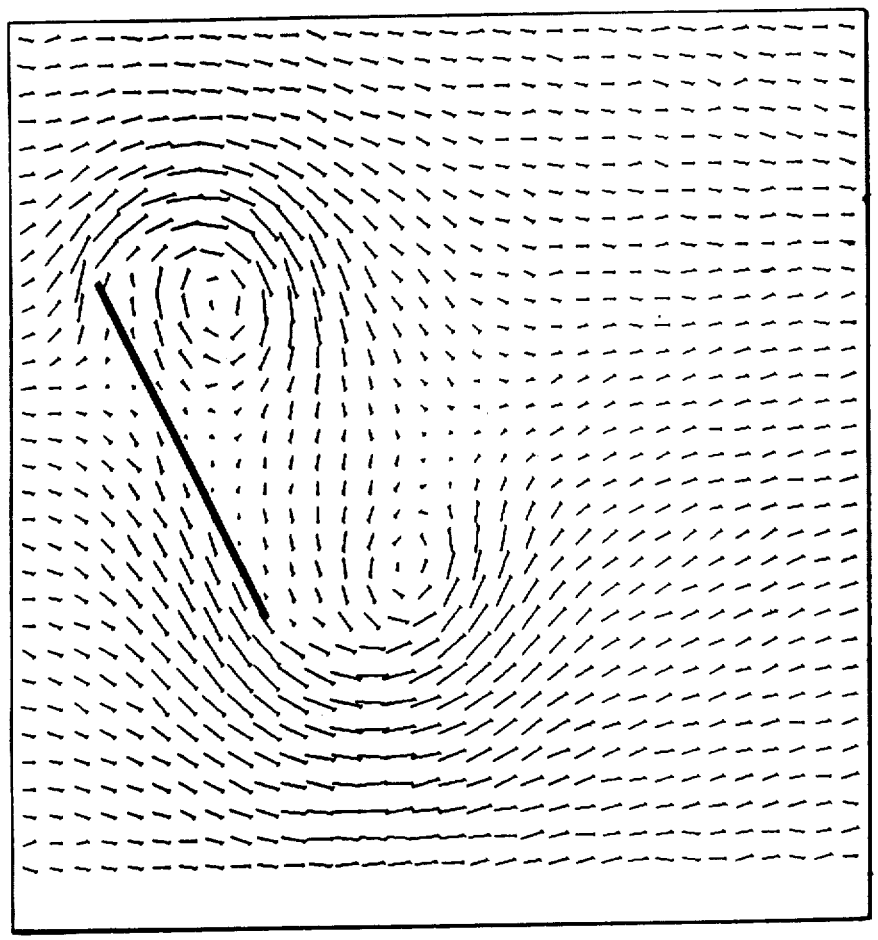
Figure 2C:
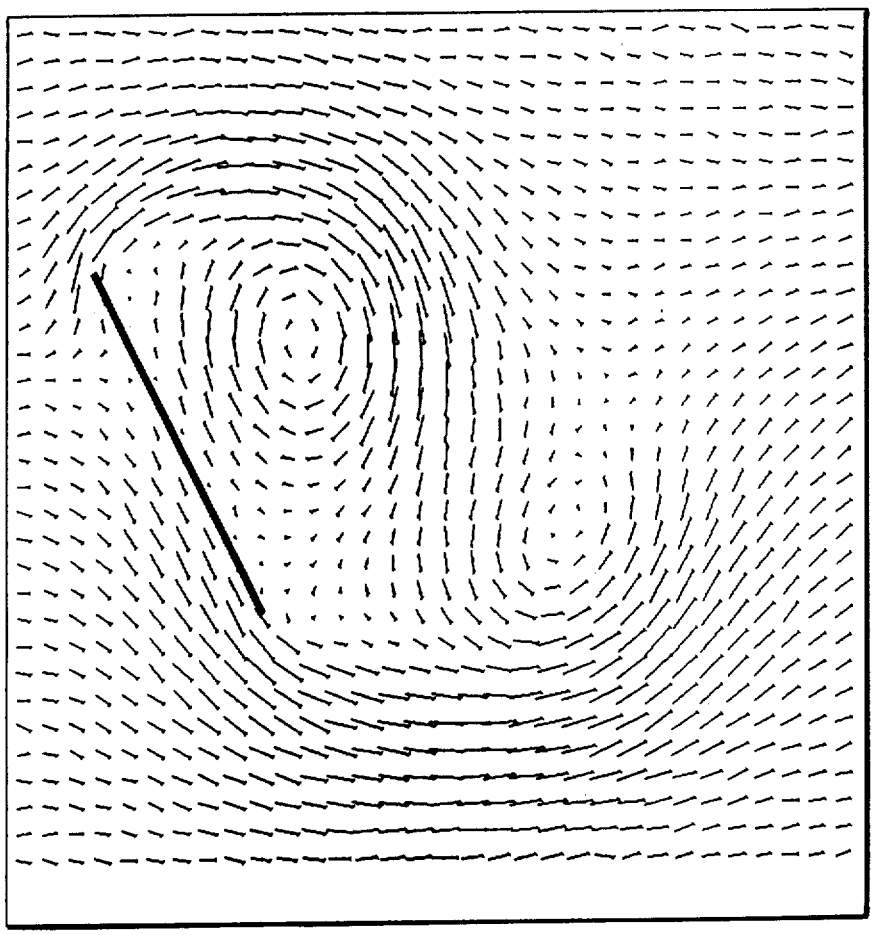
Figure 2D:
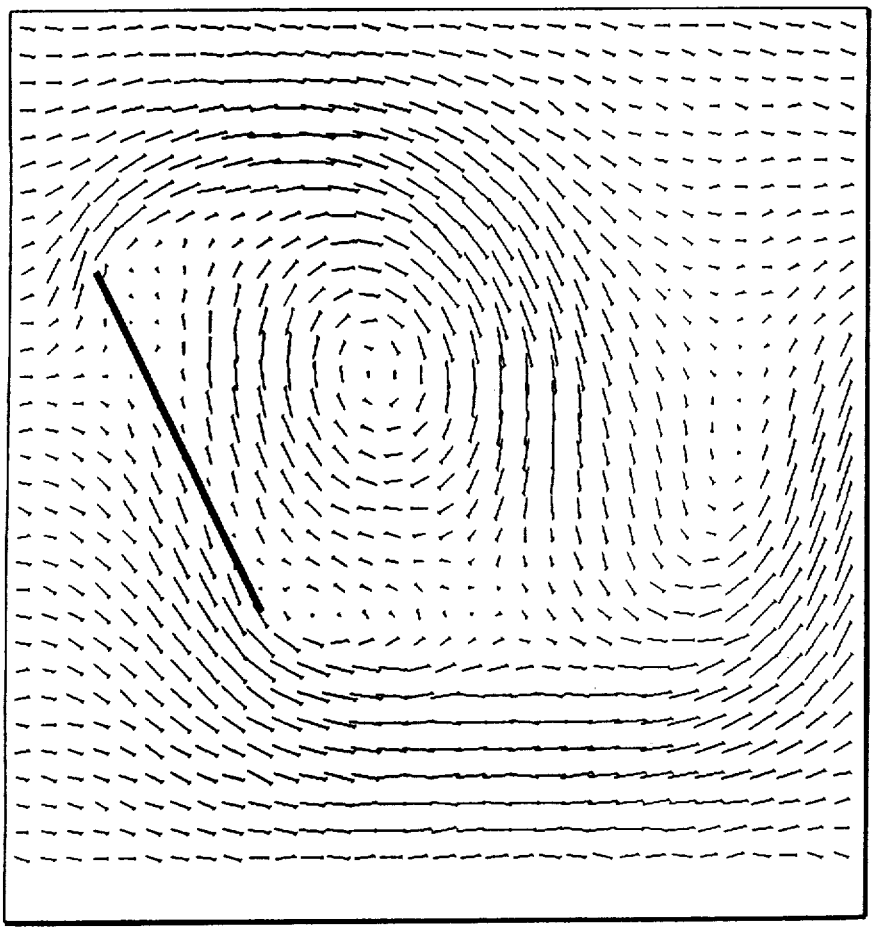
Figure 2E:
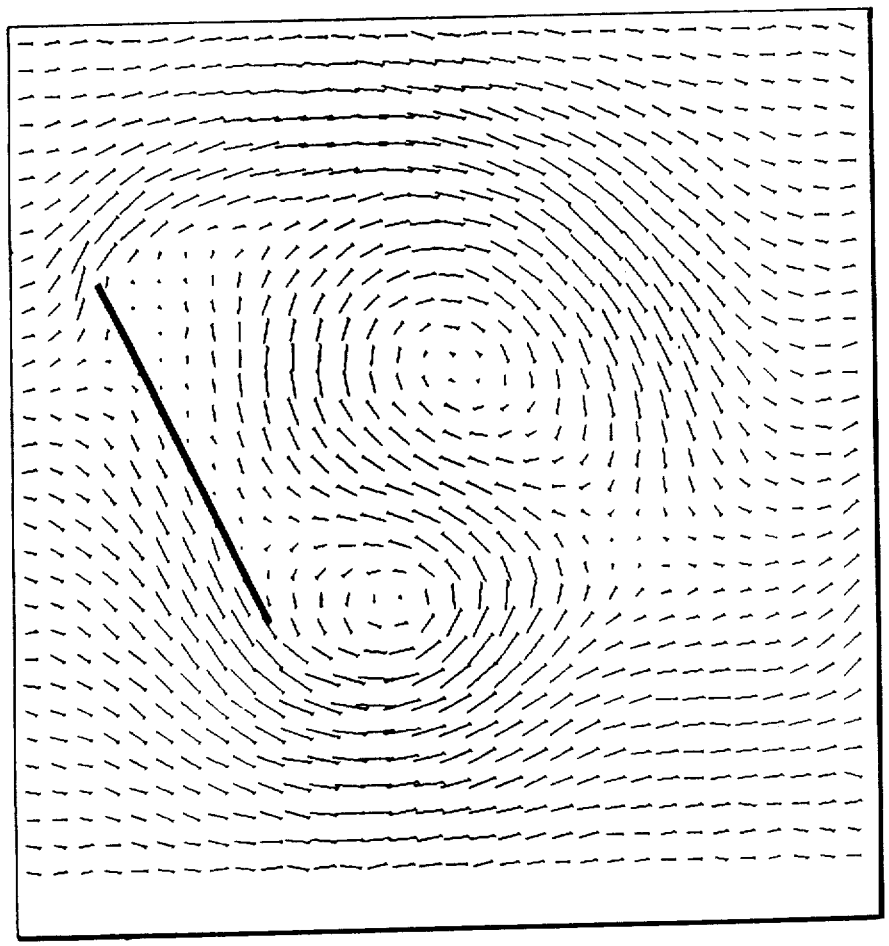
Figure 2F:
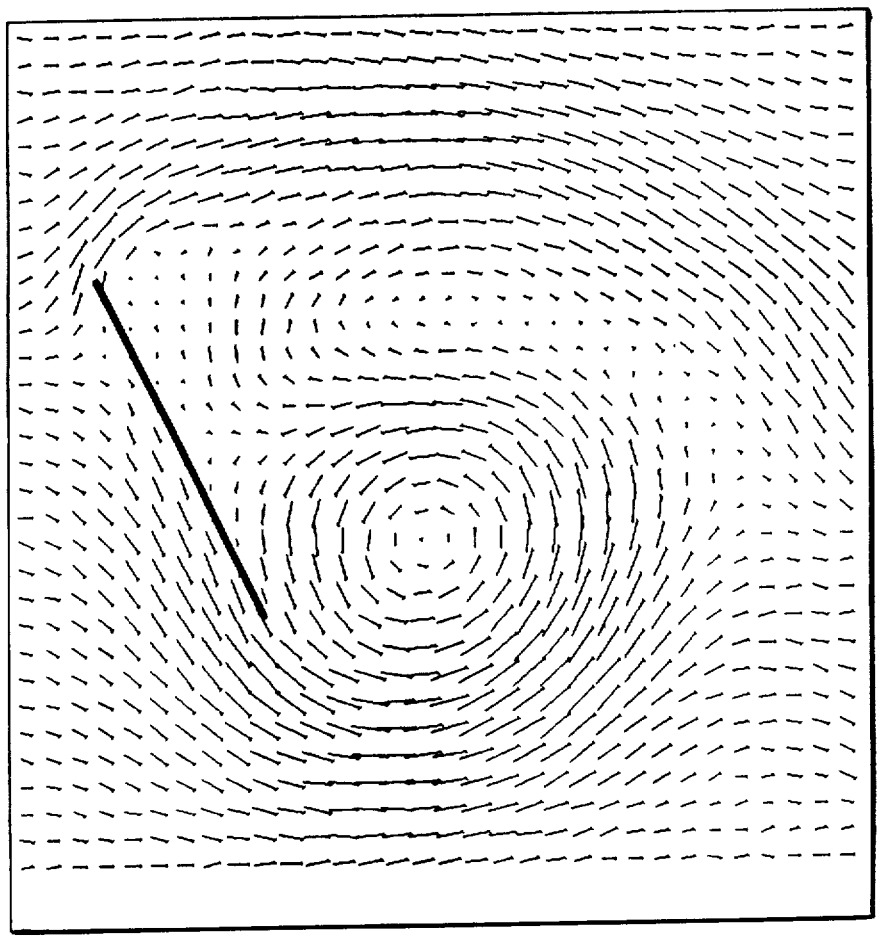
Figure 2G:
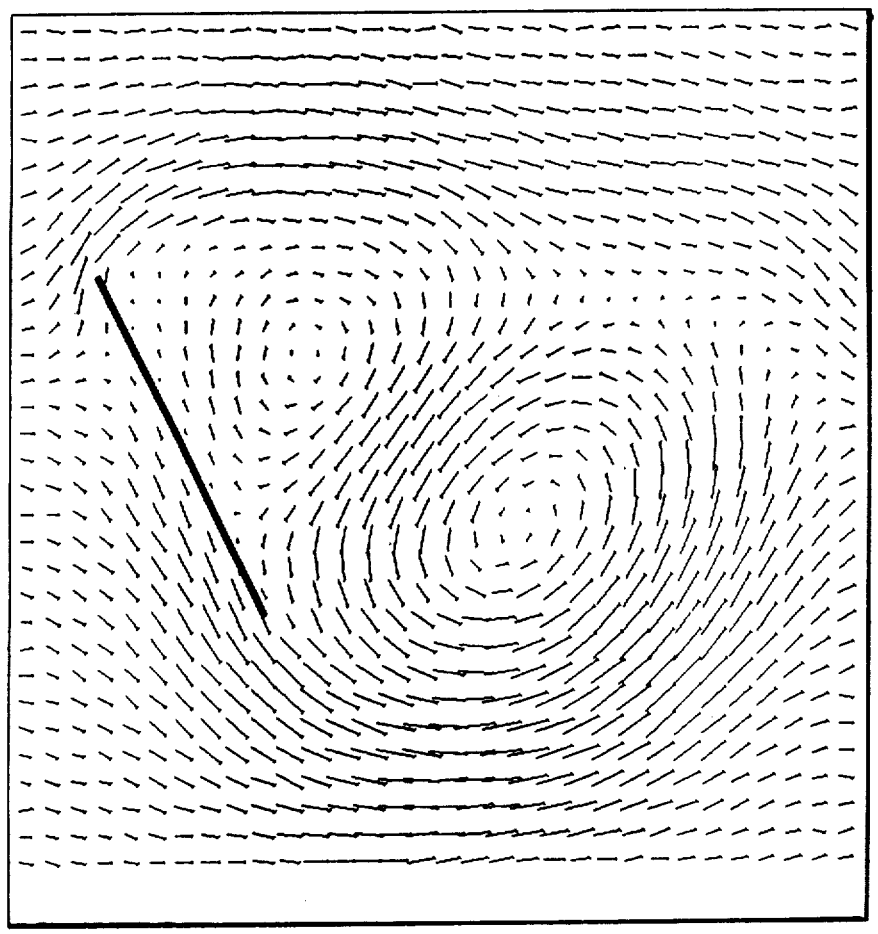
Figure 2H:
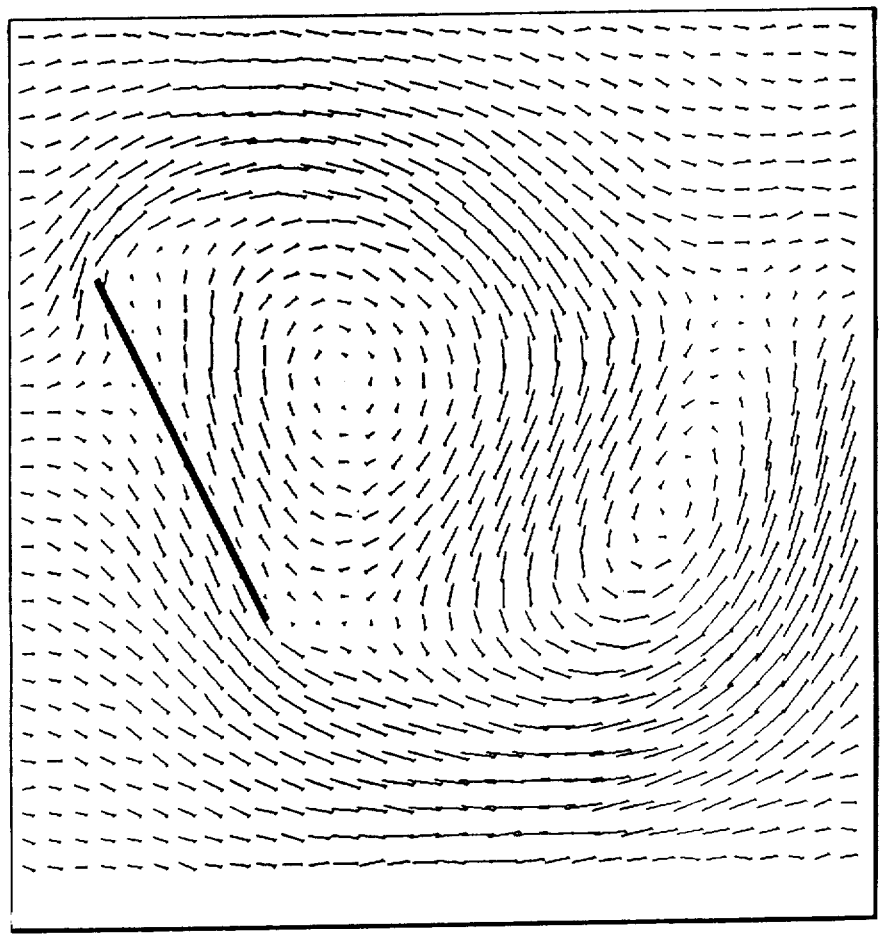
Figure 21:
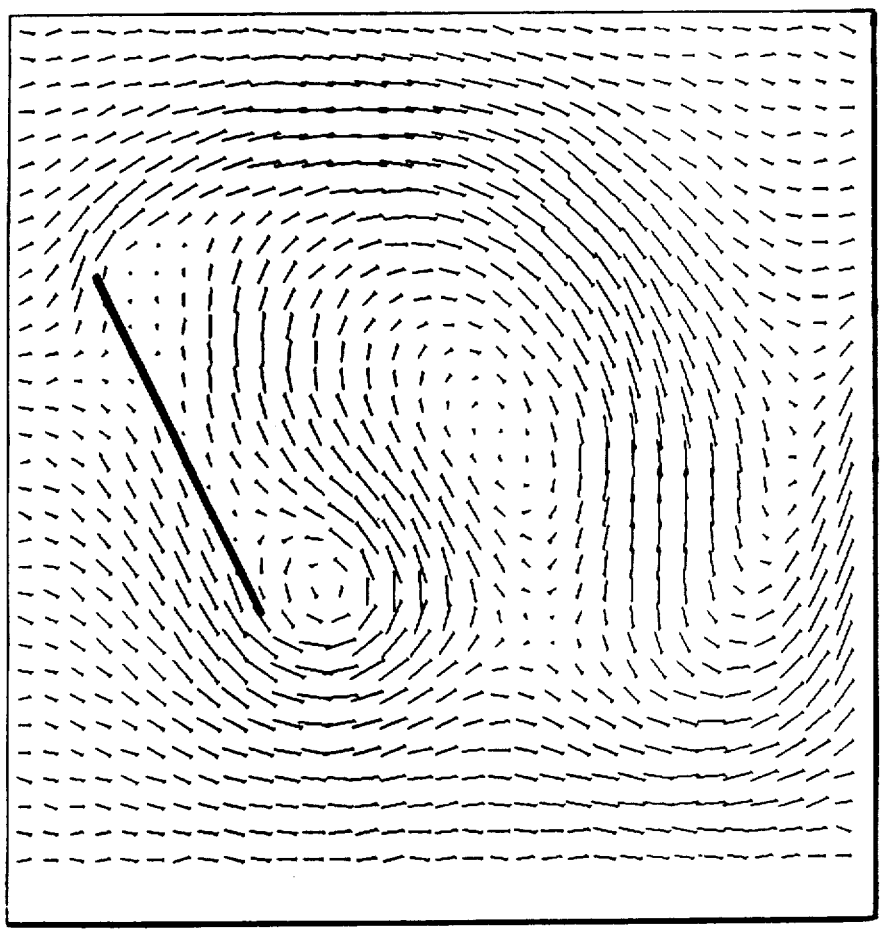

Examples of such graphical outputs are shown in FIGS. 2A through 2I for the case of fluid flow entering from the left of a two-dimensional space 300 of 2048×2048 hexagonal cells in which is located a straight edge 305. FIG. 2A depicts the initial state of the system. FIGS. 2B through 2I depict successive flow patterns determined in accordance with the invention at t=10,000; 20,000; 30,000; etc. where t is the number of cycles of calculations made on the cells of space 300. The formation and movement of vortices characteristic of flow patterns will be apparent.

Figure 3:
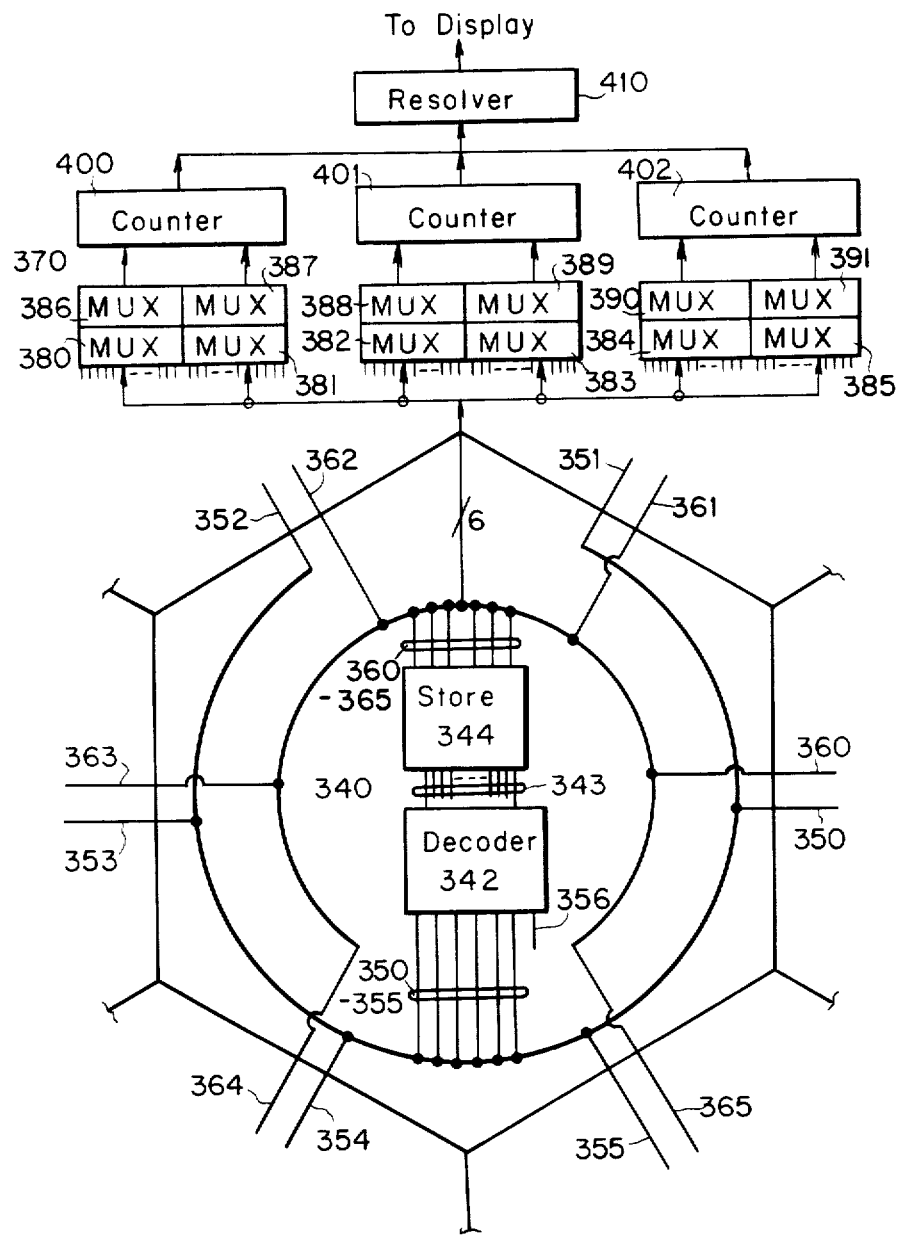
FIG. 3 depicts in schematic form the processing elements associated with one hexagon for practicing an illustrative embodiment of the invention.

The foregoing process may be implemented in many different ways. For example, as shown in FIG. 3, in one embodiment of the invention each hexagon 310 is represented by a look-up table or memory 340 that has six address input lines 350–355, one from each of its six nearest neighbor hexagons, and six output lines 360–365 to each of its six nearest neighbor hexagons. Look-up table 340 implements Table I as well as any reflection table that might be used in the practice of the invention. The signals on the six address input lines 350–355 constitute an address to the look-up table; and the look-up table implements the set of rules that specify the outputs on the six output lines for each of the 64 ($=2^6$) possible inputs that can be received at a hexagon on address lines 350–355. The six output lines 360–365 provide the inputs to the six nearest neighbor hexagons required for the next determination of the outputs with the next cycle of the process.

The look-up table comprises a decoder 342 and a store 344. The decoder produces a select signal on one of its output lines 343 in response to the signals on its input lines. The memory stores all 64 possible outward flow patterns and produces a particular output flow pattern on lines 360–365 that is selected by the select signal from decoder 342.

Advantageously, decoder 342 has at least one other address input line 356 which is used to specify when reflection takes place and the decoder produces an output on one of 128 output lines 343 in response to one of the 128 different signal patterns that may be applied to the seven input lines 350–356. Advantageously, look-up table 340 is implemented using commercially available memory chips. In this case the 64 possible output signal patterns are stored at 64 addresses of the memory in accordance with relationships defined by Table I and the same set of 64 possible output signal patterns are stored at another 64 addresses of the memory in accordance with the relationship defined by a reflection table. As a result of this arrangement, it is possible to switch a particular hexagon from a transmitting mode to a reflecting mode simply by altering the value of the bit on the seventh address line 356, a feature that makes it possible to readily alter the shape of the surface being studied in the simulation.

Alternatively, memory requirements could be reduced by accessing each address of store 344 with more than one output line 343. This, however, requires custom-made memory chips.

As is apparent from Table I, some input flow patterns have more than one possible output flow pattern. While each such output pattern could be selected randomly, practice of the invention demonstrates that this is not required. To use each output pattern at least some of the time, it is sufficient to ensure that when the inward flow pattern is oriented in some of the six possible orientations with respect to the faces of the hexagon one of the possible outward flow patterns is selected and when the inward flow pattern is oriented in other possible orientations each of the other possible outward flow patterns is selected The look-up tables 340 are organized into super cells simply by grouping contiguous look-up tables together and connecting the outputs of each of these tables to a summing network 370. For each side of the hexagons in a group, the summing network adds up the total number of flows through that side. From the six magnitudes representative of the number of flows through each of the six sides of the hexagons in a super cell, the summing network computes a resultant vector. The magnitude and orientation of this vector is then provided to a display device such as a plotter or CRT which plots the vector at its correct position, magnitude and orientation in a display.

Summing network 370 can be implemented in numerous ways. The summing function adds binary values present on output lines 360–365 from each of the 4096 look-up tables 40 in a super cell to which it is connected. Illustratively, this function is implemented by using a multiplexer to access in turn one of the output lines from each of the look-up tables in a super cell to read the binary value on that line and by accumulating the total value for that output line in a binary counter. Since flows through opposite sides of a hexagon cancel, values on the output lines associated with one face of a hexagon may be used to increment the counter while values on the output lines associated with the opposite face of the hexagon may be used to decrement the counter.

Accordingly, for each super cell the summing network illustrated comprises three counters 400, 401, 402, for counting flows on the 0-axis, 1-axis and 2-axis, respectively and multiplexers 380–391 for interfacing the outputs of the look-up tables to the counters. Advantageously, the multiplexers are connected in tiers so that multiplexers 380–385 each comprise 64 multiplexers having 64 signal inputs and one signal output each and multiplexers 386–391 each have 64 signal inputs from the 64 signal outputs of one of multiplexers 380–385 and one signal output to a counter. For each counter, there are inputs from two multiplexers such that the signal from one multiplexer increments the counter while the signal from the other multiplexer decrements the counter.

The summing network further comprises a resolver 410 that takes the magnitudes recorded in counters 400, 401, 402 for flow along the three axes and the known angular relationships between each direction of flow and calculates the contribution of each magnitude to a single resultant vector. Thus, the magnitude recorded by counter 401 for the 1-axis is resolved into horizontal and vertical components by multiplication by cosine 60° and cosine 30° respectively; and a similar calculation is made for the magnitude recorded by counter 402 for the 2-axis. The horizontal values with appropriate sign are then added to the magnitude recorded by counter 400 for the 0-axis. The two vertical components are also added. These horizontal and vertical components are then used to calculate the magnitude and orientation of the resultant vector using standard trigonometric formulae. This magnitude and orientation is then supplied to an appropriate display device for generation of a display of this vector in the space being studied.

Resolver 410 may be implemented in numerous ways. A different resolver could be used for each super cell or one resolver could be time shared by several super cells. Alternatively, the resolver could be incorporated in a general purpose computer used to generate the display.

Preferably, however, the invention is implemented in a general purpose computer rather than the special purpose device of FIG. 3. A suitable program for implementing the invention on a general purpose computer is set forth in Appendix I. The program is written in Common LISP, a dialect of LISP. Common LISP is described in detail in Guy L. Steele, Jr., *Common LISP: The Language* (Digital Press 1984) which is incorporated herein by reference.

Before discussing this program, it is desirable to understand how the hexagonal array is represented in the memory of a general purpose computer. As indicated above, the flow into or out of a hexagonal cell may be represented by a six digit binary number. Since flow through the side of a cell is simultaneously flow out of one cell into another, it is sufficient to represent the state of all flow in the hexagonal array with a single six digit binary number for each cell of the array.

In the computer program of Appendix I the six digit binary numbers representative of the state of all flows are identified as "cell values"; and the array of all "cell-values" is identified as "config". The program is organized so that each cell value represents flow in terms of all flows out of the cells. The direction of flow is represented in the same fashion as in FIG. 1 and Table I so that the righthandmost digit of each six digit number represents flow to the right through side 0 of a hexagon, the next digit represents flow to the upper right through side 1, and so on.

In addition to representing flow at every hexagon in the array, it is also necessary to represent any obstacle to flow through the hexagon. This can be done by using a single bit for each hexagon to represent the presence or absence of an obstacle that would impede flow. In the computer program of Appendix I the array of bits that specify obstacles is identified as the "reflect-config".

In most general purpose computers, memory is organized in the form of consecutively numbered memory addresses or locations. In the program of Appendix I each of the cell values of "config" is stored at a different memory address in an order which represents the hexagonal array. In particular, memory addresses are assigned in consecutive number order in a raster pattern starting with the cell in the upper left hand corner of the two-dimensional space, followed by the cell immediately to its right on the horizontal or 0-axis, and so forth to the upper right hand corner, then to the cell on the left hand side on the row immediately below the first row, the cell immediately to its right and so forth to the cell on the bottom row at the lower right hand corner of the array. Since the cells are hexagonal, every even row is offset by the dimension of one-half cell from every odd row. Thus, in the 2048×2048 array of cells used in the practice of the invention, the relative memory addresses assigned to the cells in the upper lefthand corner of the two-dimensional space are:

TABLE II

| 0000 | | 0001 | | 0002 | | 0003 | | |
|------|------|------|------|------|------|------|------|---|
| | 2048 | | 2049 | | 2050 | | 2051 | ... |
| 4096 | | 4097 | | 4098 | | 4099 | | ... |
| | 7144 | | 7145 | | 7146 | | | ... |

TABLE II-continued

...

Since Table II depicts both the relative orientation of the hexagonal cells and their memory locations, it also depicts the memory location of the nearest neighbors of a cell. In particular, for a cell in an even row, the distances in memory addresses to its nearest neighbors are:

TABLE III

| | −2048 | | −2048 + 1 | |
|---|---|---|---|---|
| −1 | | cell | | +1 |
| | +2048 | | +2048 + 1 | | and for a cell in an odd row the distances in memory addresses to its nearest neighbors are:

TABLE IV

| | −2048 − 1 | | −2048 | |
|---|---|---|---|---|
| −1 | | cell | | +1 |
| | +2048 − 1 | | +2048 | |

We can generalize these relationships in terms of distances in the orthogonal directions x and y by setting $x=1$ and $y=2048$. In such case, the distances to the nearest neighbor cells for a cell in an even row are given by:

TABLE V

| | −y | | −y + x | |
|---|---|---|---|---|
| −x | | cell | | +x |
| | +y | | +y + x | | and the distances to the nearest neighbor cells for a cell in an odd row is given by:

TABLE VI

| | −y − x | | −y | |
|---|---|---|---|---|
| −x | | cell | | +x |
| | +y − x | | +y | |

If the even rows are offset to the left of the odd rows, instead of to the right as shown in Table II, then Table V will depict the distances between cells for a cell in an odd row and Table VI the distances between cells for a cell in an even row.

Referring now to Appendix I, the first set of forms is a set of defconstant special forms which define the directions to the right (tr), to the upper right (tur), to the upper left (tul), etc. in terms of the position of this direction in the six digit binary word or cell value representative of direction of flow. The next set of forms is another set of defconstant special forms which define masks useful in selecting particular directions in a cell value. Thus, tr-mask selects the first bit of the cell value associated with the direction of flow to the right, etc. The third set of forms is a set of defconstant special forms that define masks that isolate flow on the 0-axis, the 1-axis and the 2-axis by forming the inclusive OR of the masks for the two directions on that axis. The fourth form is a defconstant special form that is used to mask all bits of a cell value by means of the binary equivalent of the decimal number 63.

Reflection rules are specified by three defconstant special forms "bounce-back-reflectance", "specular-reflectance-horizontal" and "specular-reflectance-vertical". In "bounce-back-reflectance", a flow is reflected through the same side of the hexagon it entered. In "specular-reflectance-horizontal", the flow is reflected as if it encountered a horizontal reflector in the cell; and in "specular-reflectance-vertical", the flow is reflected as if it encountered a vertical reflector in the cell.

The function NEXT-CELL-STATE computes the next cell value or state of a cell at the location x, y in the hexagonal array where x is the columnar position of the cell in the array and y is its row position. As shown in the flow chart of FIG. 4, the next cell state is computed by first testing for a reflection. This is done by testing for a non-zero value in the reflect-config array at the location x, y in the array. If there is a reflection, the function REFLECT-CELL is called and used to implement one of the reflection rules. The function REFLECT-CELL is executed to transform the cell value associated with location x, y in the array to a new-value. It uses two masks, old-direction-mask and new-direction-mask and initially sets new-value equal to zero. Old-direction-mask initially is set equal to 000001. New-direction-mask implements the reflection rule. The function successively examines each bit of the cell-value by forming the logical AND of the cell-value and old-direction-mask and shifting the 1-bit in old-direction-mask one bit to the left after each test. In each case where the bit is non-zero, a new cell-value is formed by the inclusive OR of new-value and new-direction-mask.

If there is no reflection, a new cell-value is computed by moving each flow one cell distance, determining if there is a collision and, if so, implementing the collision rules.

Flows are moved by obtaining for the cell at memory location x, y the coordinates in memory of the cells that are its nearest neighbors and retrieving from each of those memory locations the bit representative of the presence or absence of a flow in the direction toward the cell at memory location x, y. The coordinates in memory of the nearest neighbor cells are defined by the function CELL-NEIGHBOR-LOCATION. This function, for example, specifies that the coordinates of the nearest neighbor cell to the right of the cell at memory location x,y are obtained by incrementing x by one. Likewise, the coordinates of the nearest neighbor cell to the upper right are obtained by decrementing y and if y is even (i.e., the cell is in an even row) incrementing x. As will be apparent, this function implements the relationships set forth in Tables V and VI.

The coordinates of the memory location of a nearest neighbor cell provide the parameters new-x, new-y. The particular digit in the cell value at memory location new-x, new-y that represents flow toward the cell at memory location x, y is selected by taking the logical AND of (cell-value new-x, new-y) and the appropriate mask. For example, in the case of the nearest neighbor cell to the right of the cell at memory location x, y, flow to the left is the direction of flow toward the cell at memory location x, y. Flow to the left is flow through side 3 of the hexagon and is represented by a digit in the fourth place from the righthand side of the six digit cell value. Accordingly, to select this digit in the nearest neighbor cell, the program uses the mask *tl-mask* which has a binary value 001000. By this means, for the cell at memory location x, y, the program reads from the memory locations of its six nearest neighbors one bit each representative of the presence or absence of flow toward the cell at memory location x, y. If there are no collisions, momentum and the number of flows are conserved and the flows represented by these six bits continue in the same direction. Hence these six bits represent the new cell value at memory location x, y.

The existence of a collision at the cell at memory location x, y is determined by the function INTERACT-CELL. This function first identifies the flows on the same axis by forming the logical AND of the mask for that axis and the new cell value determined for memory location x, y. The number of flows on each axis is then determined by counting; and the total number of flows is determined by adding the number of flows for each axis. It is also determined if there are flows on all axes and if there are flows on just one axis.

The results of different types of collisions are then determined. If the new cell value is 010101 (=decimal value 21) or 101010 (=decimal value 42), there is a three way symmetric collision. The results of such a collision as -;>shown in Table I are the same values 010101 or 101010. In the program of Appendix I these values are chosen randomly by generating a random integer less than 2, i.e., either 0 or 1, and testing if it is zero. For one random state the exclusive OR of the cell mask and the cell value is formed. Since cell mask=111111, this changes all the digits in the cell value. For the other random state, the cell value is left unchanged.

Two-way collisions are identified by determining if the total number of flows is two and the flows are on just one axis; and four-way collisions are identified by determining if the total number of flows is four and these flows are not on all axes. In each of these cases as shown in Table I, there are three possible outward flows. The particular outward flow is selected by generating a random integer less than three, i.e., 0, 1 or 2. The cell value is then rotated 0, 1 or 2 places depending on which random integer was generated and an output is formed by the logical AND of the cell mask and the rotated cell value.

If the total number of flows is three but there is not a flow on each axis, then the collision is a three-way asymmetric collision. In this case, there are two possible outward flows as shown in Table I. They are selected by generating a random integer less than 2. For one of the two possible random values, the opposed flows remain on the same axis. For the other value they are shifted to the axis on which there is no other flow.

As a result of the foregoing, INTERACT-CELL calculates a new cell value for all cases of opposing collision shown in Table I.

The program of Appendix I is used to calculate the next cell state for each cell in the hexagonal array. After completion of one such calculation for the entire array, the process is then repeated for as many additional cycles as desired.

To generate a visual display of the results of these calculations, the execution of the program of Appendix I can be interrupted at the completion of any cycle so as to permit the execution of a program that calculates the resultant vectors for the cell values in the super cell. A program for doing this will be evident from the description of the hardware of FIG. 3 that provides the same function. Briefly, as shown in FIG. 4 the computer program counts the number of flows through each of the sides of the hexagons in a supercell by separately counting the non-zero bits in each of the six digit positions of the cell values. The resulting six magnitudes are then resolved into a single vector. The magnitudes representative of the flows in opposite directions on the same axis are subtracted from each other, and the remaining three magnitudes are resolved into horizontal and vertical components. The sums of the horizontal and vertical components are then used to define a resultant vector having a magnitude and orientation that is provided to an appropriate display.

The program of Appendix I may be executed on numerous general purpose computers. However, because of the number of cells in array 300, execution of many thousands of cycles of the program for each cell in the array is a time consuming task for even the largest and fastest of today's serial computers. For that reason, the invention preferably is practiced in a single-instruction multiple data (SIMD) computer such as the Connection Machine Computer. This computer is described in detail in application Ser. No. 499,474.

Figure 5:
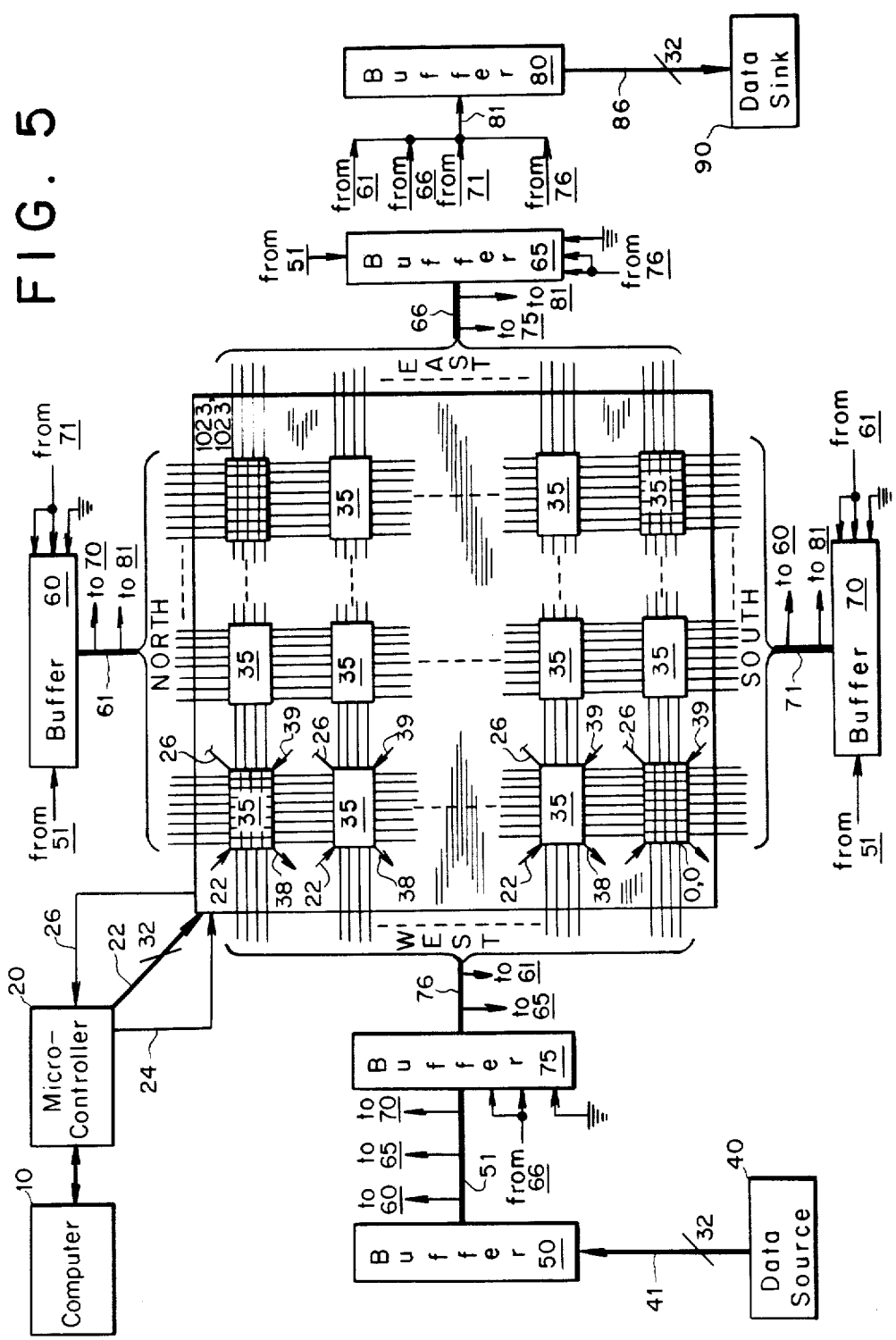
FIGS. 5 and 6 depict in schematic form details of a SIMD processor preferably used in the practice of the invention.

As shown in FIG. 1A of that application which is reproduced in FIG. 5, the computer system comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX (TM) computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 and connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

In the embodiment of the Connection Machine Computer used in the practice of the present invention, array 30 contains 2048 ($=2^{11}$) identical ICs 35; and each IC 35 contains 16 ($=2^4$) identical processor/memories 36. Thus, the entire array 30 contains 32,768 ($=2^{15}$) identical processor/memories 36.

Processor/memories 36 are organized and interconnected in two geometries. The geometry of interest to the present invention is a conventional two-dimensional grid pattern in which the processor/memories are organized in a rectangular array and connected to their four nearest neighbors in the array. For convenience, the sides of this square array are identified as NORTH, EAST, SOUTH and WEST.

To connect each processor/memory to its four nearest neighbors, the individual processor/memories are connected by electrical conductors between adjacent processor/memories in each row and each column of the grid; and the four nearest neighbors of an IC except those on the edges of the array will be recognized to be the four ICs immediately adjacent that IC on the North, East, South and West, respectively.

Figure 6:
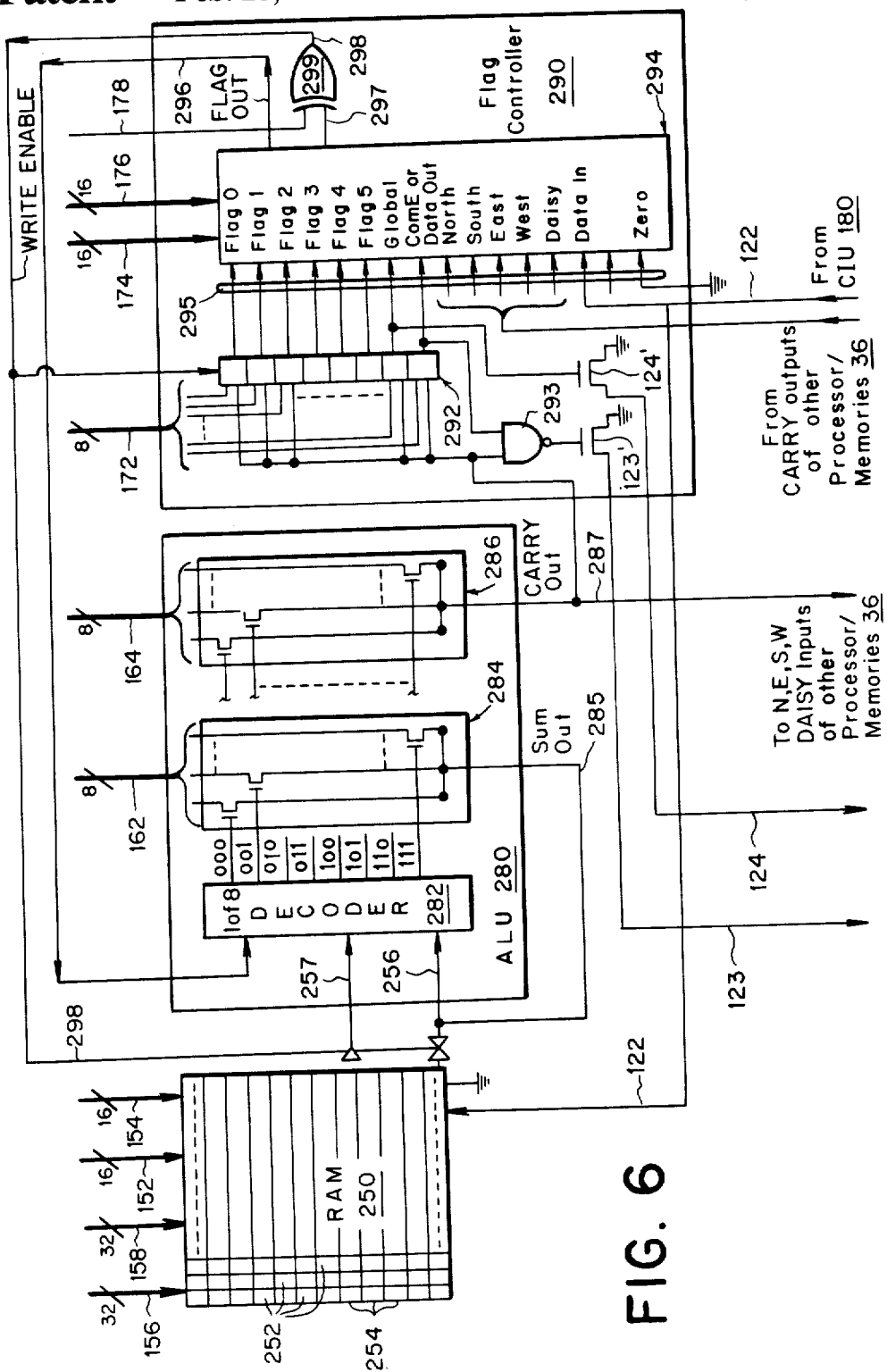

An illustrative processor/memory 36 is disclosed in greater detail in FIG. 6 which is the same as FIG. 7A of the '474 application. As shown in FIG. 6, the processor/memory comprises random access memory (RAM) 250, arithmetic logic unit (ALU) 280 and flag controller 290. The ALU operates on data from three sources, two registers in the RAM and one flag input, and produces two outputs, a sum output that is written into one of the RAM registers and a carry output that is made available to certain registers in the flag controller as well as to certain other processor/memories.

The inputs to RAM 250 are busses 152, 154, 156, 158, a sum output line 285 from ALU 270, the message packet input line 122 from communication interface unit (CIU) 180 of FIG. 6B of the '474 application and a WRITE ENABLE line 298 from flag controller 290. The outputs from RAM 250 are lines 256, 257. The signals on lines 256, 257 are obtained from the same column of two different registers in RAM 250, one of which is designed Register A and the other Register B. Busses 152, 154, 156, 158 address these registers and the columns therein in accordance with the instruction words from microcontroller 20. Illustratively, RAM 250 has a memory capacity of 4096 bits.

Flag controller 290 is an array of eight one-bit D-type flip-flops 292, a two-out-of-sixteen selector 294 and some logic gates. The inputs to flip-flops 292 are a carry output signal from ALU 280, a WRITE ENABLE signal on line 298 from selector 294, and the eight lines of bus 172 from programmable logic array (PLA) 150 of FIG. 6B of the '474 application. Lines 172 are address lines each of which is connected to a different one of flip-flops 292 to select the one flip-flop into which a flag bit is to be written. The outputs of flip-flops 292 are applied to selector 294.

The inputs to selector 294 are up to sixteen flag signal lines 295, eight of which are from flip-flops 292, and the sixteen lines each of busses 174, 176. Again, lines 174 and 176 are address lines which select one of the flag signal lines for output or further processing. Selector 294 provides outputs on lines 296 and 297 that are whichever flags have been selected by address lines 174 and 176, respectively.

The flags are defined in detail in Table IV of the '474 application. Of particular interest, the North, East, South and West flags are the inputs to the processor/memory from the carry output lines of the nearest neighbor processor/memories to the North, East, South and West. It has been found advantageous to implement the flag controller so that the North, East, South and West Flags time share a single register in selector 294.

ALU 280 comprises a one-out-of-eight decoder 282, a sum output selector 284 and a carry output selector 286. As detailed in the '474 application, this enables it to produce sum and carry outputs for many functions including ADD, logical OR and logical AND. ALU 280 operates on three bits at a time, two on lines 256, 257 from Registers A and B in RAM 250 and one on line 296 from flag controller 290. The ALU has two outputs: a sum on line 285 that is written into Register A of RAM 250 and a carry on line 287 that may be written into a flag register 292 and applied to the North, East, South, West and DAISY inputs of the other processor/memories 36 to which this processor/memory is connected.

The program of Appendix I can be run on the Connection Machine Computer with tremendous increase in speed since the 32,768 processors of the embodiment that has been used can simultaneously calculate in parallel new cell values for 32,768 cells of the array. To use the Connection Machine Computer in such calculation it is necessary to simulate the hexagonal array in the two-dimensional rectilinear grid in which the processor/memories of the Connection Machine Computer are connected. In particular, it is necessary to simulate an array in which each processor/memory has six nearest neighbors and information flows along three axes at equal angles to each other.

Figure 7:
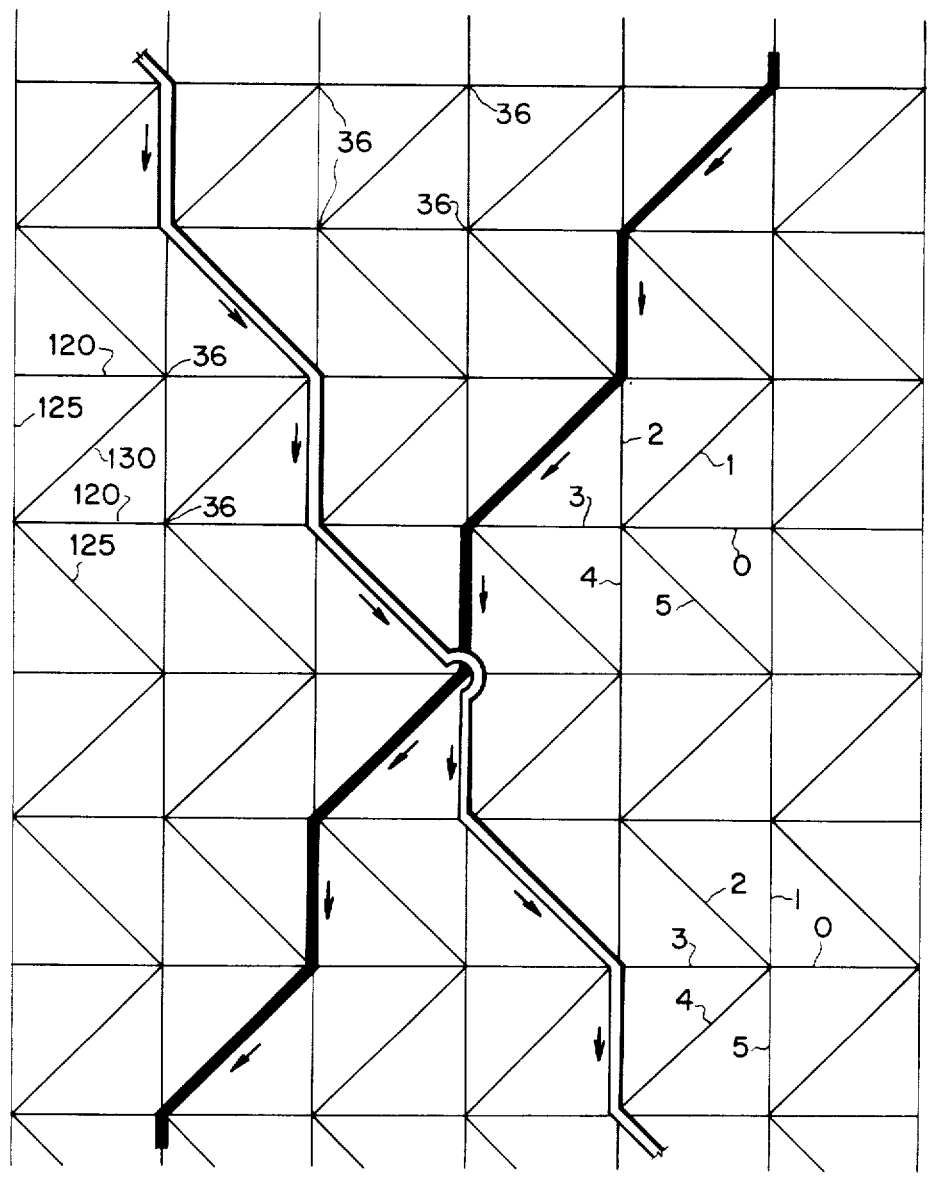
FIG. 7 is sketch illustrating the projection of a hexagonal array onto a rectangular grid.

A method for doing this is illustrated schematically in FIG. 7 which depicts a rectilinear grid of processor/memories 36 that are interconnected by horizontal and vertical lines 420, 425, respectively. The horizontal lines represent the EAST and WEST connections between adjacent processor/memories in the rectilinear grid of the Connection Machine Computer and the vertical lines represent the NORTH and SOUTH connections between adjacent processor/memories. As is apparent from FIGS. 5 and 6 these connections are implemented in the form of physical wires between the adjacent processor/memories in the rectilinear grid.

In addition to these physical connections, each processor/memory is also connected to two other processor/memories along two diagonals 430, 435 of the grid that are not located on the same axis. As a result, this connection pattern zig-zags down the columns of the grid. Alternatively this pattern could zig-zag along the rows of the grid.

The zig-zag connection pattern is not implemented by physical wires between processor/memories. Rather, it is implemented in the computer in software so that the computer shifts data diagonally from a source to a destination by first shifting the data from a source processor/memory to the adjacent processor/memory in either the horizontal or vertical direction and then shifting the data in the other rectilinear direction to the destination processor/memory.

In addition to providing six nearest neighbors for each processor/memory, the zig-zag pattern of FIG. 7 also supports movement of data along three axes in a pattern characteristic of a hexagonal grid. This is achieved by defining the axes of the grid as: (1) the horizontal or EAST-WEST connections; (2) a succession of alternating vertical and diagonal connections running from the upper left to lower right of the grid and (3) a succession of alternating vertical and diagonal connections running from the upper right to the lower left. As shown in FIG. 7, the rate of movement along such diagonal axes is exactly the same as in a hexagonal array, namely two cells up or down for each cell to the right or left.

This definition of axes can also be related to the faces 0-5 of the hexagon as shown in FIG. 7. In the case of an even row, faces 0 and 3 are on the EAST-WEST axis; faces 1 and 4 are on the same axis even though face 1 is associated with the diagonal to the upper right and face 4 is associated with the downward vertical; and faces 2 and 5 are on the same axis even though face 2 is associated with the upward vertical and face 5 with the diagonal to the lower right. In the case of an odd row, faces 0 and 3 are again on the EAST-WEST axis; faces 1 and 4 are on the same axis even though face 1 is associated with the upward vertical and face 4 is associated with the diagonal to the lower left; and faces 2 and 5 are on the same axis even though face 2 is associated with the diagonal to the upper left and face 5 is associated with the downward vertical. In effect, these connections implement the relationships of Tables V and VI.

In the event the zig-zag pattern runs along the rows, the three axes are defined as: (1) the vertical or NORTH-SOUTH connections; (2) a succession of alternating horizontal and diagonal connections running from upper left to the bottom right; and (3) a succession of alternating horizontal and diagonal connections running from the upper right to the bottom left.

The present invention can also take advantage of another feature of the Connection Machine Computer: its ability to subdivide each processor memory into several units that function identically. In effect, each unit operates as a separate processor/memory sharing the RAM, ALU and flag controller of one physical processor/memory. The number of such units that can be implemented in one physical processor/memory depends on the memory requirements for each unit. In the present invention, the memory requirements are relatively small since the only data that must be stored for each cell of the hexagonal array is the six bit cell value specifying flow out of the cell and one bit that indicates whether the cell presents an obstacle to flow. As a result, it is possible to store in one physical processor/memory with a storage capacity of 4096 bits the cell values and obstacle data of 256 separate cells; and each physical processor/memory can therefore function in the array as 256 processors.

The subdivision of one physical processor/memory into several is accomplished by partitioning the memory in each physical processor/memory in the same fashion and providing in microcontroller 20 of FIG. 5 the capacity of having each physical processor memory operate first on one portion of the partitioned memory, then on the next portion of the partitioned memory and so on through each cell value stored in the memory. The sequence of operations performed on each portion of the partitioned memory is that specified in the program of Appendix I and the flow chart of FIG. 4. The capability of advancing from one portion of the partitioned memory to the next portion is achieved by specifying the memory addresses (x,y) for the cell value in relative terms in the program and then incrementing these addresses when advancing from one portion of the partitioned memory to the next.

As will be apparent to those skilled in the art, numerous modifications may be made within the scope of the above described invention. While the invention has been described in terms of a two-dimensional space that is represented by a hexagonal array of processors and/or data, other arrays may also prove useful in representing physical phenomena. For example, rectilinear arrays of processors or data with connections to four nearest neighbors along their horizontal and vertical nearest neighbors along their horizontal and vertical axes may be useful in some instances; and rectilinear arrays with connections from each processor or data element to eight nearest neighbors along the horizontal, vertical and diagonal axes of the array may be useful in others. Representations of three-dimensional space using processors or data structures that are interconnected in accordance with one of the Brevais lattices may also prove useful in modelling three-dimensional phenonema.

While the invention has been described in terms of the solution to the Navier-Stokes equation, it may also be applied to the solution of other partial differential equations descriptive of other phenonema in two and three dimensions. Problems of diffusion, heat flow and the movement of matter are examples of other technologies to which the present invention may be applied.

```
;;; -*- Mode: LISP; Syntax: Common-Lisp ; Base: 10; Package: COMMON-LISP-USER -*-
;;;*********************************************************************
;;; For hexagonal turbulence
;;; Each cell has 6 bits -- direction particle is moving
;;;
;;;            R  UR UL L  DL DR  |  R= Right L= Left D= Down U= Up
;;; direction  0  1  2  3  4  5
;;;
;;; we encode this in the real news grid by having
;;;   R  = east   UR = north (y even), northeast (y odd)   UL = northwest (y even), up (y odd)
;;;   L  = west   DL = southwest (y even), south (y odd)   DR = south (y even), southeast (y odd)
;;;
;;;          Y ODD                       Y EVEN
;;;         UL---UR                     UL---UR
;;;           |                           |
;;;           |                           |
;;;         L ------- R                 L ------- R
;;;           |                           |
;;;           |                           |
;;;         DL---DR                     DL---DR
;;;
;;; This gives us a rectangular section of a hexagonal lattice
;;; The east-west axis is corresponds to the horizontal axis of the hexagonal lattice
;;;
;;; In the CM 2D news grid DOWN is in the positive Y direction and RIGHT is in the positive X
;;; direction
;;;
;;; It is sometimes useful to think about the axes
;;;   AXIS 0 is the horizonal axis
;;;   AXIS 1 goes from UR to DL
;;;   AXIS 2 goes from UL to DR ;;; Hexagonal Interactions [implemented by INTERACT-CELL]
;;;   There are 4 types
;;;   1) Two way interactions where net momentum is zero (3 varieties)
;;;   2) Four way interactions where net momentum is zero (3 varieties)
```

```
;;;   3) Three way symmetric interactions where net momentum is zero (2 varieties)
;;;   4) Three way interactions where two of the particles interact head on (12 varieties)

;;; Reflection Rules : [implemented by REFLECT-CELL]
;;; "Bounce Back" Reflectance :
;;; When a particle enters a reflective cell (i.e. where REFLECT-CONFIG is 1) then the particle
;;; bounces back and moves in the opposite direction.

;;; "Specular" Reflectance
;;; When a particle enters a reflective cell (i.e. where REFLECT-CONFIG is 1)  then the particle
;;; if is reflected through an angle of two times the angle of incidence with the surface.  This
;;; is the same as the reflection of rays light from a mirror.

;;; Primitive Functions used by the following code :
;;;   (CONFIG-CELL config x y) returns the value of the configuration CONFIG at location (X,Y)
;;;   as a fixnum
;;; Definition of Directions
(defconstant *tr*  0)
(defconstant *tur* 1)
(defconstant *tul* 2)
(defconstant *tl*  3)
(defconstant *tdl* 4)
(defconstant *tdr* 5)

;;; Masks used to select particular directions within a cell value (defconstant *tr-mask*  1)
(defconstant *tur-mask* 2)
(defconstant *tul-mask* 4)
(defconstant *tl-mask* 8)
(defconstant *tdl-mask* 16)
(defconstant *tdr-mask* 32)

;;; Masks particles along a particular axis
(defconstant *axis-0-mask* (logior *tr-mask* *tl-mask*))
     (defconstant *axis-1-mask* (logior *tur-mask* *tdl-mask*))
     (defconstant *axis-2-mask* (logior *tul-mask* *tdr-mask*))

;;; Masks all bits
(defconstant *cell-mask*   63.)

;;; Reflection Rules
;;;                              Entry direction :::   *tr* *tur* *tul* *tl* *tdl* *tdr*

(defconstant *bounce-back-reflectance*          '(*tl* *tdl* *tdr* *tr* *tur* *tul*))

;;; Specular reflectance off of horizontal surfaces
(defconstant *specular-reflectance-horizontal* '(*tl* *tdr* *tdl* *tr* *tul* *tu r*))

;;; Specular reflectance off of vertical surfaces
(defconstant *specular-reflectance-vertical*   '(*tl* *tul* *tur* *tr* *tdr* *tdl*))

(defun CELL-NEIGHBOR-LOCATION (x y direction)
  "This implements the mapping of the Hexagonal Lattice onto the 2D news grid"
  "Returns the nearest xy news grid location to location X Y in direction DIRECT ION"
  (declare (return-list new-x new-y))
  (case direction
    ;;; indexes to a particular case
    (*tr*  (incf x))
    (*tur* (decf y)
            (if (evenp y) (incf x)))
    (*tul* (decf y)
            (if (oddp y) (decf x)))
    (*tl*  (decf x))
    (*tdl* (incf y)
            (if (oddp y) (decf x)))
    (*tdr* (incf y)
            (if (evenp y) (incf x)))
    )
  (values x y))
(defun REFLECT-CELL (cell-value &optional (rule *BOUNCE-BACK-REFLECTANCE*)
                         ;; or *SPECULAR-REFLECTANCE-HORIZONTAL*
                         ;; or *SPECULAR-REFLECTANCE-VERTICAL*
                         )
```

```
   "This implements the reflection rule"
   (let ((old-direction-mask 1)
         new-direction-mask
         (new-value 0))

(dolist (new-direction rule)

(setq new-direction-mask (lsh 1 new-direction)) ;; Turns the direction (0 to 5) into a bit
                                                       ;; mask (0 to 32)
       (when (not (zerop (logand cell-value old-direction-mask)))
             (setq new-value (logior new-value new-direction-mask)))

(setq old-direction-mask (lsh old-direction-mask 1))
       )
     new-value))

(defun NEXT-CELL-STATE (config x y reflect-config)
  "Computes the next state of a particular cell"

(macrolet ((get-cell-value (x y)
                  "This macro performs the reflection calculation"

`(let ((cell (config-cell config ,x ,y)))
                     (when (not (zerop (config-cell reflect-config ,x ,y)))
                       (setq cell (reflect-cell cell)))
                     cell)))

(let ((cell-value
                ;;; implements conservation of momentum
                ;;; particles moving in a particular direction move to the next cell in that
                ;;; direction and stay moving in that direction unless a interaction occurs (logior ;;; combine particles from each of the directions ;;; Get coordinate of cell to left
                  (multiple-value-bind (new-x new-y) (cell-neighbor-location x y *tl*)
                  ;;; pick out its right moving particle
                  (logand (get-cell-value new-x new-y) *tr-mask*))

;;; Get coordinate of cell to right
                  (multiple-value-bind (new-x new-y) (cell-neighbor-location x y *tr*)
                  ;;; pick out its right moving particle
                  (logand (get-cell-value new-x new-y) *tl-mask*))

;;; Get coordinate of cell to down left
                  (multiple-value-bind (new-x new-y) (cell-neighbor-location x y *tdl*)
                  ;;; pick out its right moving particle
                  (logand (get-cell-value new-x new-y) *tur-mask*))

;;; Get coordinate of cell to up left
                  (multiple-value-bind (new-x new-y) (cell-neighbor-location x y *tul*)

;;; pick out its right moving particle
                  (logand (get-cell-value new-x new-y) *tdr-mask*))

;;; Get coordinate of cell to down right
                  (multiple-value-bind (new-x new-y) (cell-neighbor-location x y *tdr*)

;;; pick out its right moving particle
                  (logand (get-cell-value new-x new-y) *tul-mask*))

;;; Get coordinate of cell to up right
                  (multiple-value-bind (new-x new-y) (cell-neighbor-location x y *tur*)

;;; pick out its right moving particle
                  (logand (get-cell-value new-x new-y) *tdl-mask*)))))

(interact-cell cell-value))))

(defun INTERACT-CELL (cell-value)
```

"Implements interaction rules. This implementation simply picks a random number to decide which direction the particles should move in after the interaction"

```
(let* (;;; particles along a particular axis
        (axis-0 (logand *axis-0-mask* cell-value))
        (axis-1 (logand *axis-1-mask* cell-value))
        (axis-2 (logand *axis-2-mask* cell-value))

;;; number of particles along a particular
        (num-particles-on-axis-0 (logcount axis-0))
        (num-particles-on-axis-1 (logcount axis-1))
        (num-particles-on-axis-2 (logcount axis-2))

(total-particles
          (+ num-particles-on-axis-0 num-particles-on-axis-1 num-particles-on-axis-2))

;;; True if at one least one particle on each axis
        (particles-on-all-axes-p (not (or (zerop num-particles-on-axis-0)
                                           (zerop num-particles-on-axis-1)
                                           (zerop num-particles-on-axis-2))))

;;; True if particles on just one axis
        (particles-on-just-one-axis-p
          (and (not (zerop total-particles))
               (or (and (zerop num-particles-on-axis-0) (zerop num-particles-on-axis-1))
                   (and (zerop num-particles-on-axis-1) (zerop num-particles-on-axis-2))
                   (and (zerop num-particles-on-axis-2) (zerop num-particles-on-axis-0)))))
  (or (= cell-value 21.) (= cell-value 42.))
  (if (zerop (random 2))
      (logxor cell-mask cell-value)
      cell-value))

(;;; 2-way and 4-way
   (or (and (= total-particles 2.) particles-on-just-one-axis-p)
       (and (= total-particles 4.) (not particles-on-all-axes-p)))

(let ((interaction-shift (random 3)))
     (logand cell-mask (logior (lsh cell-value interaction-shift)
                                (lsh cell-value (- interaction-shift 6))))))

(;;; 3-way-asymmetric
   (and (= total-particles 3) (not particles-on-all-axes-p))
   (if (zerop (random 2))
       (logior (case num-particles-on-axis-0 (0 *axis-0-mask*) (1 axis-0) (2 0))
               (case num-particles-on-axis-1 (0 *axis-1-mask*) (1 axis-1) (2 0))
               (case num-particles-on-axis-2 (0 *axis-2-mask*) (1 axis-2) (2 0)))
       cell-value))

(t cell-value))))
```

What is claimed:

1. A method of simulating the flow of fluid through a space using a plurality of digital data processors interconnected in an array, said method comprising the steps of:

assigning each said processor to represent a region of said space, implementing a rule at each processor that specifies outward flow of fluid from said region in response to inward flow of fluid to said region, said fluid flow being represented by a signal provided from one processor to another, determining with each processor in accordance with said rule signals representing the outward flow of fluid from said region in response to signals representing the inward flow of fluid to said region, said signals representing the outward flow of fluid being provided to processors representing neighboring regions of said space as signals representing the inward flow of fluid, and repeating said determining step over a plurality of cycles using as signals representative of inward flow of fluid those signals representing the outward flow of fluid that were determined by processors representing neighboring regions of said space in a previous cycle.

2. The method of claim 1 wherein the digital data processors are connected in a hexagonal array so that a processor is connected to six nearest neighbor processors in the array.

3. The method of claim 2 wherein the rule that specifies outward flow in response to inward flow requires that the number of outward flows be the same as the number of inward flows and that momentum be conserved.

4. The method of claim 1 wherein said space is tessellated into a hexagonal array and flow through each hexagon of said array is represented by a six digit number in which each digit represents flow through one side of the hexagon.

5. The method of claim 4 wherein each digit of the six digit number is a binary digit in which one binary value represents flow and the other binary value represents the absence of flow.

6. The method of claim 5 wherein the rule that specifies outward flow in response to inward flow requires that the number of outward flows be the same as the number of inward flows and that momentum be conserved.

7. The method of claim 4 wherein the hexagonal array is subdivided into a group of super cells, said method further comprising the steps of:
for each digit position in the six digit number, summing the value of the digits at that position,
determining from the sums thus generated a resultant vector, and
providing an output signal representative of said resultant vector.

8. The method of claim 1 wherein said space is tessellated into an array of cells each having n nearest neighbors and flow at each processor in the array is represented by an n digit number in which each digit represents flow between a processor and one of it nearest neighbors.

9. The method of claim 8 wherein each digit of the n digit number is a binary digit in which one binary value represents flow and the other binary value represents the absence of flow.

10. The method of claim 8 wherein the rule that specifies outward flow in response to inward flow requires that the number of outward flows be the same as the number of inward flows and that momentum be conserved.

11. The method of claim 8 wherein the array is divided into a group of super cells, said method further comprising the steps of:
for each digit position in the n digit number, summing the value of the digits at that position,
determining from the sums thus generated a resultant vector, and
providing an output signal representative of said resultant vector.

12. The method of claim 1 wherein the rule that specifies outward flow in response to inward flow requires that the number of outward flows be the same as the number of inward flows and that momentum be conserved.

13. The method of claim 1 wherein the rule that specifies outward flow in response to inward flow also specifies the outward flows in the event an obstacle is encountered.

14. A method of simulating the flow of fluid through a space comprising the steps of:
representing the space with an array of cellular automata,
implementing at each cellular automaton a rule specifying a direction of outward flow of the fluid in response to a direction of inward flow of the fluid in a region of said space,
ordering said array to represent the space, said cellular automata being interconnected along the directions of inward and outward flow so that a specification of a direction of outward flow from one automaton constitutes a specification of a direction of inward flow into an adjacent automaton,
representing the flow of fluid into said space by providing an inward flow into at least one cellular automaton at commencement of a simulation, and
repeatedly applying the rule over a plurality of cycles to each of the automata of the array using as directions of inward flow of the fluid to an automaton the directions of outward flow of the fluid from adjacent automata in a previous cycle.

15. The method of claim 14 wherein said space is tessellated into a hexagonal array of cellular automata and flow through each hexagon of said array is represented by a six digit number in which each digit represents flow through one side of the hexagon.

16. The method of claim 15 wherein the hexagonal array is subdivided into a group of super cells, said method further comprising the steps of:
for each digit position in the six digit number, summing the value of the digits at that position,
determining from the sums thus generated a resultant vector, and
providing an output signal representative of said resultant vector.

17. The method of claim 14 wherein the cellular automata are interconnected in an array of n nearest neighbors and flow at each automaton in the array is represented by an n digit number in which each digit represents flow between an automaton and one of its nearest neighbors.

18. The method of claim 17 wherein each digit of the n digit number is a binary digit in which one binary value represents flow and the other binary value represents the absence of flow.

19. The method of claim 17 wherein the number of outward flows is the same as the number of inward flows and momentum is conserved.

20. The method of claim 17 wherein the array is divided into a group of super cells, said method further comprising the steps of:
for each digit position in the n digit number, summing the value of the digits at that position,
determining from the sums thus generated a resultant vector, and
providing an output signal representative of said resultant vector.

21. A method of simulating the solution or a system of partial differential equations in a space of two or three dimensions using a plurality of digital data process interconnected in an array, said method comprising the steps of:
assigning each said processor to represent a region of said space,
implementing a rule at each processor that specifies outward movement from said region in response to inward movement to said region, said movement being represented by a signal provided from one processor to another,
determining with each processor in accordance with said rule signals representing the outward movement from said region in response to signals representing the inward movement to said region, said signals representing the outward movement being provided to processors representing neighboring regions of said space as signals representing the inward movement, and
repeating said determining step over a plurality of cycles using as signals representative of inward movement those signals representing the outward movement that were determined by processors representing neighboring regions of said space in a previous cycle.

22. A method of simulating the solution of a system of partial differential equations in a space of two or three dimensions comprising the steps of:

representing the space with an array of cellular automata, implementing at each cellular automaton a rule specifying a direction of outward movement in response to a direction of inward movement in a region of said space, ordering said array to represent the space, said cellular automata being interconnected along the directions of inward and outward movement so that a specification of a direction of outward movement from one automaton constitutes a specification of a direction of inward movement into a adjacent automaton, representing movement into said space by providing an inward movement into at least one cellular automaton at commencement of a simulation, and repeatedly applying the rule over a plurality of cycles to each of the automata of the array using as direction of inward movement to an automaton the directions of outwardly movement from adjacent automata in a previous cycle.

23. A method of simulating the solutions of a system of partial differential equations in a space of two or three dimensions comprising the steps of representing the space with an array of multi- digit-numbers each of which digits represents movement at a point in said space in a direction determined by its position in the number, interrelating said numbers along the directions of movement between said points in space so that a specification of a direction of outward movement from one number constitutes a specification of inward movement to an adjacent number, calculating movement between adjacent points in said space in accordance with a rule that specifies a direction of outward movement from a point in response to a direction of inward movement to said point, representing movement into said space by providing an inward movement into at least one point in said space, and repeatedly applying the rule over a plurality of cycles to each of the numbers of the array using as directions of inward movement to a point the directions of outward movement specified in the numbers associated with adjacent points in space.

24. Apparatus for simulating the flow of fluid through a space comprising:

a plurality of digital data processors interconnected in an array, each said processor assigned to represent a region of said space and implementing a rule that specifies outward flow of fluid from said region in response to inward flow of fluid to said region, said fluid flow being represented by a signal provided from one processor to another, means for generating with each processor in accordance with said rule signals representing the outward flow of fluid from said region in response to signals representing the inward flow of fluid to said region, said signals representing the outward flow of fluid being provided to processors representing neighboring regions of said space as signals representing the inwardly flow of fluid, and means for repeating said generating step over a plurality of cycles using as signals representative of inward flow of fluid those signals representing the outward flow of fluid that were determined by processors representing neighboring regions of said space in a previous cycle.

25. The apparatus of claim 24 wherein the digital data processors are connected in a hexagonal array so that a processor is connected to six nearest neighbor processors in the array.

26. The apparatus of claim 25 wherein the rule that specifies outward flow in response to inward flow requires that the number of outward flows be the same as the number of inward flows and that momentum be conserved unless an obstacle to said flow is encountered.

27. The apparatus of claim 24 wherein said space is tessellated into a hexagonal array and flow through each hexagon of said array is represented by a six digit number in which each digit represents flow through one side of the hexagon.

28. The apparatus of claim 27 wherein each digit of the six digit number is a binary digit in which one binary value represents flow and the other binary value represents the absence of flow.

29. The apparatus of claim 28 wherein the rule that specifies outward flow in response to inward flow requires that the number of outward flows be the same as the number of inward flows and that momentum be conserved unless an obstacle to said flow is encountered.

30. The apparatus of claim 27 wherein the hexagonal array is subdivided into a group of super cells, said apparatus further comprising:

means for summing the value of the digits at each digit position in the six digit number, means for determining from the sums thus generated a resultant vector, and means for providing an output signal representative of said resultant vector.

31. The apparatus method of claim 24 wherein the digital data processors are interconnected in an array of n nearest neighbors and flow at each processor in the array is represented by an n digit number in which each digit represents flow between a processor and one of its nearest neighbors.

32. The apparatus of claim 31 wherein each digit of the n digit number is a binary digit in which one binary value represents flow and the other binary value represents the absence of flow.

33. The apparatus of claim 31 wherein the rule that specifies outward flow in response to inward flow requires that the number of outward flows be the same as the number of inward flows and that momentum be conserved unless an obstacle to said flow is encountered.

34. The apparatus of claim 31 wherein the array is divided into a group of super cells, said apparatus further comprising:

means for summing the value of the digits at each digit position in the n digit number, means for determining from the sums thus generated a resultant vector, and means for providing an output signal representative of said resultant vector.

35. The apparatus of claim 24 wherein the rule that specifies outward flow in response to inward flow requires that the number of outward flows be the same as the number of inward flows and that momentum be conserved unless an obstacle to said flow is encountered.

36. Apparatus for simulating the flow of fluid through a space comprising:
- an array of cellular automata each of which comprises a rule specifying a direction of outward flow of the fluid in response to a direction of inward flow of the fluid in a region of said space, said cellular automata being interconnected along the directions of inward and outward flow so that a specification of a direction of outward flow from one automaton constitutes a specification of a direction of inward into an adjacent automaton,
- means for representing the flow of fluid into said space by providing an inward flow into at least one cellular automaton at commencement of a simulation, and
- means for repeatedly applying the role over a plurality of cycles to each of the automata of the array using as directions of inward flow of the fluid to an automaton the directions of outward flow of the fluid from adjacent automata in a previous cycle.

37. Apparatus for simulating the solution of a system of partial differential equations in a space of two or three dimensions comprising:
- a plurality of digital data processors interconnected in an array, each said processor assigned to represent a region of said space and implementing a rule that specifies outward movement from said region in response to inward movement to said region, said movement being represented by a signal provided from one processor to another,
- means for generating with each processor in accordance with said rule signals representing the outward movement from said region in response to signals representing the inward movement to said region, said signals representing the outward movement being provided to processor representing neighboring regions of said space as signals representing the inward movement, and
- means for repeating said generating step over a plurality of cycles using as signals representative of inward movement those signals representing the outward movement that were determined by processors representing neighboring regions of said space in a previous cycle.

38. Apparatus for simulating the solution of a system of partial differential equations in a space of two or three dimensions comprising:
- an array of cellular automata each of which comprises a rule specifying a direction of outward movement in response to a direction of inward movement in a region of said space, said cellular automata being interconnected along the directions of inward and outward movement so that a specification of a direction of outward movement from one automaton constitutes a specification of a direction of inward movement into an adjacent automaton,
- means for representing movement into said space by providing an inward movement into at least one cellular automaton at commencement of a simulation, and
- means for repeatedly applying the rule over a plurality of cycles to each of the automata of the array using as directions of inward movement to an automaton the directions of outward movement from adjacent automata in a previous cycle.

39. Apparatus for simulating the solutions of a system of partial differential equations in a space of two or three dimensions comprising:
- means for storing an array of multi-digit-numbers each of which digits represents movement at a point in said space in a direction determined by its position in the number, said numbers being interrelated along the directions of movement between said points in space so that a specification of a direction of outward movement from one number constitutes a specification of inward movement to an adjacent number,
- means for calculating movement between adjacent points in said space in accordance with a rule that specifies a direction of outward movement from a point in response to a direction of inward movement to said point,
- means for representing movement into said space by providing an inward movement into at least one point in said space, and
- means for repeatedly applying the rule over a plurality of cycles to each of the numbers of the array using as directions of inward movement to a point the directions of outward movements specified in the numbers associated with adjacent points in space.

* * * * *